(12) United States Patent
Golomedov et al.

(10) Patent No.: US 11,676,393 B2
(45) Date of Patent: Jun. 13, 2023

(54) METHOD AND SYSTEM FOR TRAINING MACHINE LEARNING ALGORITHM TO DETECT OBJECTS AT DISTANCE

(71) Applicant: YANDEX. TAXI LLC, Moscow (RU)

(72) Inventors: Aleksey Evgenievich Golomedov, Ramensky (RU); Oleg Yurievich Kudashev, Saint Petersburg (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 580 days.

(21) Appl. No.: 16/718,127

(22) Filed: Dec. 17, 2019

(65) Prior Publication Data

US 2020/0210715 A1    Jul. 2, 2020

(30) Foreign Application Priority Data

Dec. 26, 2018 (RU) ................................. 2018146462

(51) Int. Cl.
*G06V 20/56* (2022.01)
*G06N 20/00* (2019.01)
*G05D 1/02* (2020.01)

(52) U.S. Cl.
CPC .......... *G06V 20/56* (2022.01); *G05D 1/0248* (2013.01); *G05D 1/0257* (2013.01); *G06N 20/00* (2019.01)

(58) Field of Classification Search
CPC .... G05D 1/0248; G05D 1/0257; G06N 20/00; G06V 20/56; G06V 10/82; G06V 20/58; G06V 20/582; G06V 20/584; G06V 20/64
See application file for complete search history.

(56) References Cited

U.S. PATENT DOCUMENTS 9,612,123 B1 * 4/2017 Levinson .................. G01S 5/16
9,760,090 B2    9/2017 Shashua et al.
(Continued)

FOREIGN PATENT DOCUMENTS

CN    108932840 A    12/2018
RU    2671054 C1    10/2018
(Continued)

OTHER PUBLICATIONS

European Search Report dated May 26, 2020 issued in respect of the related European Patent Application No. 19209548.7.
(Continued)

*Primary Examiner* — Angelina Shudy
(74) *Attorney, Agent, or Firm* — BCF LLP

(57) ABSTRACT

A method and server for training a machine-learning algorithm (MLA) to detect objects in sensor data acquired by a second sensor mounted on a second vehicle located at a second distance from the objects, the MLA having been trained to detect the objects in sensor data acquired by a first sensor mounted on a first vehicle located at a first distance from the objects. First sensor data acquired by the first sensor on the first vehicle is aligned with second sensor data acquired by the second sensor on the second vehicle. The MLA determines objects and objects classes in the aligned first sensor data. The object classes in the aligned first sensor data are assigned to corresponding portions in the aligned second sensor data. The MLA is trained on the labelled portions in the aligned second sensor data to recognize and classify objects at the second distance.

20 Claims, 8 Drawing Sheets

(56) References Cited

U.S. PATENT DOCUMENTS

| | | | |
|---|---|---|---|
| 10,145,945 B2 | 12/2018 | Harada | |
| 10,262,234 B2* | 4/2019 | Li | G01S 17/89 |
| 10,373,323 B1* | 8/2019 | Kim | B60R 1/00 |
| 10,486,485 B1* | 11/2019 | Levinson | B60G 17/0162 |
| 10,740,658 B2* | 8/2020 | Pollach | G06V 10/803 |
| 10,769,453 B2* | 9/2020 | Ban | B60R 1/00 |
| 10,839,694 B2* | 11/2020 | Raichelgauz | G06V 10/768 |
| 10,884,411 B1* | 1/2021 | Allais | G06N 3/08 |
| 11,091,162 B2* | 8/2021 | Lindholm | G06V 20/58 |
| 11,181,929 B2* | 11/2021 | Kelkar | H04W 4/08 |
| 11,204,605 B1* | 12/2021 | Allais | G05D 1/0088 |
| 11,301,767 B2* | 4/2022 | Levinson | G06N 20/00 |
| 11,507,084 B2* | 11/2022 | Sharma | H04W 4/46 |
| 11,521,396 B1* | 12/2022 | Jain | G06V 20/58 |
| 2008/0040004 A1* | 2/2008 | Breed | G01S 7/023 |
| | | | 701/45 |
| 2010/0198513 A1 | 8/2010 | Zeng et al. | |
| 2013/0158852 A1 | 6/2013 | Stahlin et al. | |
| 2014/0195138 A1* | 7/2014 | Stelzig | G08G 1/0116 |
| | | | 701/119 |
| 2017/0124476 A1* | 5/2017 | Levinson | G06V 20/58 |
| 2018/0024565 A1 | 1/2018 | Fridman | |
| 2018/0067495 A1* | 3/2018 | Oder | G05D 1/0231 |
| 2018/0101736 A1 | 4/2018 | Han et al. | |
| 2018/0188045 A1* | 7/2018 | Wheeler | B60W 30/0956 |
| 2018/0203446 A1 | 7/2018 | Wyffels | |
| 2018/0283892 A1 | 10/2018 | Behrendt et al. | |
| 2018/0307944 A1 | 10/2018 | Li et al. | |
| 2018/0314921 A1* | 11/2018 | Mercep | G01S 13/865 |
| 2018/0365888 A1* | 12/2018 | Satzoda | G06N 3/0454 |
| 2019/0043364 A1* | 2/2019 | Jumpertz | G05D 1/0212 |
| 2019/0113927 A1* | 4/2019 | England | G06N 5/046 |
| 2019/0180115 A1* | 6/2019 | Zou | B60W 30/12 |
| 2019/0180502 A1* | 6/2019 | England | G06T 17/20 |
| 2019/0221121 A1* | 7/2019 | Guo | G08G 1/0133 |
| 2019/0225234 A1* | 7/2019 | Kumar | B60W 50/0205 |
| 2019/0227562 A1* | 7/2019 | Mohammadiha | G08G 1/0141 |
| 2019/0258876 A1* | 8/2019 | Liu | G06V 20/58 |
| 2019/0265714 A1* | 8/2019 | Ball | G06N 3/0454 |
| 2019/0272389 A1* | 9/2019 | Viente | G01C 21/3602 |
| 2019/0310650 A1* | 10/2019 | Halder | G05D 1/0088 |
| 2019/0318041 A1* | 10/2019 | Bai | G06F 16/53 |
| 2019/0354782 A1* | 11/2019 | Kee | G06V 20/58 |
| 2019/0361118 A1* | 11/2019 | Murad | G01S 17/48 |
| 2019/0384294 A1* | 12/2019 | Shashua | G06V 20/584 |
| 2019/0384303 A1* | 12/2019 | Muller | G01C 21/3407 |
| 2019/0391578 A1* | 12/2019 | Tariq | G06V 10/82 |
| 2020/0013281 A1* | 1/2020 | Eriksson | G01S 19/48 |
| 2020/0089232 A1* | 3/2020 | Gdalyahu | G01C 21/30 |
| 2020/0134378 A1* | 4/2020 | Viswanathan | G05D 1/0246 |
| 2020/0142408 A1* | 5/2020 | Valois | G05D 1/027 |
| 2020/0151611 A1* | 5/2020 | McGavran | H04W 4/40 |
| 2020/0160559 A1* | 5/2020 | Urtasun | G06K 9/629 |
| 2020/0160699 A1* | 5/2020 | Annapureddy | G08G 1/04 |
| 2020/0184236 A1* | 6/2020 | Aguiar | G06T 7/80 |
| 2020/0202145 A1* | 6/2020 | Mao | G05D 1/0088 |
| 2020/0209867 A1* | 7/2020 | Valois | G01C 21/3848 |
| 2020/0250499 A1* | 8/2020 | Kim | G06K 9/6289 |
| 2020/0272148 A1* | 8/2020 | Karasev | G06V 10/803 |
| 2020/0284591 A1* | 9/2020 | Shapira | G06V 20/588 |
| 2021/0064057 A1* | 3/2021 | Eldar | B60T 7/12 |
| 2021/0065733 A1* | 3/2021 | Sallem | G06F 18/214 |
| 2021/0101624 A1* | 4/2021 | Philbin | G06V 20/58 |
| 2021/0150280 A1* | 5/2021 | White | G01C 21/3605 |
| 2021/0172757 A1* | 6/2021 | Chen | G06F 16/583 |
| 2021/0182652 A1* | 6/2021 | Takami | G06N 3/08 |
| 2021/0191405 A1* | 6/2021 | Ma'As | G05D 1/0214 |
| 2021/0271259 A1* | 9/2021 | Karpathy | G06V 10/82 |
| 2021/0311490 A1* | 10/2021 | Fridman | G06T 7/337 |
| 2021/0342650 A1* | 11/2021 | Beluch | G06F 18/2148 |
| 2021/0365701 A1* | 11/2021 | Eshet | G01C 21/3848 |
| 2022/0026920 A1* | 1/2022 | Ebrahimi Afrouzi | |
| | | | B25J 9/1664 |
| 2022/0156517 A1* | 5/2022 | Haase-Schuetz | G06V 10/82 |
| 2022/0282990 A1* | 9/2022 | Reuveni | B60R 1/22 |
| 2022/0383745 A1* | 12/2022 | Heilbron | G06V 20/588 |

FOREIGN PATENT DOCUMENTS

| | | |
|---|---|---|
| RU | 2672394 C1 | 11/2018 |
| WO | 2018138584 A1 | 8/2018 |

OTHER PUBLICATIONS

Russian Search Report dated Oct. 22, 2021 issued in respect of the counterpart Russian Patent Application No. RU 2020113270.

\* cited by examiner

METHOD AND SYSTEM FOR TRAINING MACHINE LEARNING ALGORITHM TO DETECT OBJECTS AT DISTANCE

CROSS-REFERENCE

The present application claims priority to Russian Patent Application No. 2018146462, entitled "Method and System for Training Machine Learning Algorithm to Detect Objects at Distance", filed Dec. 26, 2018, the entirety of which is incorporated herein by reference.

FIELD OF TECHNOLOGY

The present technology relates to computer-implemented methods and systems for determining presence of an object, more specifically, to methods and systems for determining the presence of an object located at a distance around an autonomous vehicle.

BACKGROUND

Several computer based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point, to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles include computer systems that can cause the vehicle to accelerate, break, stop, change lane and self-park.

One of the main technical challenges in implementing the above computer systems is the ability for the computer system to detect an object present around the vehicle—such as the vehicle in front of the present vehicle (the present vehicle having the computer system onboard), which vehicle in front may pose a risk/danger to the present vehicle and may require the computer system to take a corrective measure, be it breaking or otherwise changing speed, stopping or changing lanes. On a more granular level, the challenge of the object detection is not just the binary detection (presence or absence of the object), but the speed and accuracy associated with such an analysis and determination (especially avoiding "false negatives", whereby the system does not identify an object which is indeed present in front or around the vehicle).

The acuteness of this problem is illustrated by the following hypothetical scenario. Imagine that the self-driving or partially-autonomous vehicle is driving along the route. A child (or an adult, a pet, and the like) runs in front of the vehicle. It is imperative that the computer system controlling the vehicle detects the presence of the object fast and take corrective actions to avoid the collision. Naturally, the faster the computer system detects the presence of the object, the more time the computer system will have to determine the corrective action and to command the vehicle to execute the corrective action.

U.S. Pat. No. 9,760,090 B2 granted on Sep. 12, 2017 to Mobileye Vision Technologies Ltd and entitled "Crowd sourcing data for autonomous vehicle navigation" teaches a method of processing vehicle navigation information for use in autonomous vehicle navigation. The method includes receiving, by a server, navigation information from a plurality of vehicles. The navigation information from the plurality of vehicles is associated with a common road segment. The method also includes storing, by the server, the navigation information associated with the common road segment. The method also includes generating, by the server, at least a portion of an autonomous vehicle road navigation model for the common road segment based on the navigation information from the plurality of vehicles. The method further includes distributing, by the server, the autonomous vehicle road navigation model to one or more autonomous vehicles for use in autonomously navigating the one or more autonomous vehicles along the common road segment.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

Developers of the present technology are aware of vehicles (computer assisted or autonomously driveable vehicles) that are equipped with multiple sensors—such as a first sensor (i.e. a camera or the like) and a second sensor (such as a LIDAR based instrument). One or more machine learning algorithm (MLAs) are generally used to recognize objects in the data acquired by the sensors.

Embodiments of the present technology have been developed based on developers' appreciation that data about surrounding environment acquired by a sensor on a second vehicle travelling behind a first vehicle may be less accurate than if a similar sensor on the first vehicle acquired the same information about the surrounding environment. Such a loss in precision and/or accuracy may be due to a variety of factors, such as nature/constraints of the sensor (e.g. limited operational range), environmental factors, presence of obstacles, and/or effects such as scattering, interference, diffusion, and the like. The obtained data may be less accurate and/or precise (e.g. a 3D LIDAR point cloud may have less data points or data points may be more scattered), which may affect the ability of the MLA to recognize objects, as the MLA has never "seen" or been trained on less accurate representations of the objects in sensor data. Thus, the MLA may not recognize objects and may not be able to relay information to a driver and/or a control system, which may in turn not take actions in consequence (such as braking for example).

Accordingly, developer(s) have recognized that the MLA may be trained for object recognition on the less accurate representations of the objects in the sensor data. To achieve that purpose, developer(s) have contemplated that a second vehicle equipped with sensors could follow a first vehicle equipped with similar sensors on a planned route, and the sensors on both the first vehicle and the second vehicle could simultaneously acquire data about the surrounding environment in the form of first vehicle data and second vehicle data. The first vehicle data and the second vehicle data could be processed to be aligned spatially and temporally, and the MLA could perform object detection and/or recognition in the first vehicle data by labelling portions of data corresponding to a given object with a class such as lane, car, human, traffic sign, obstacle, and the like.

The portions of data in the first vehicle data corresponding to labelled objects could then be matched with equivalent portions in the second vehicle data as a result of the spatial and temporal alignment, and be labelled with the corresponding classes. Finally, the labelled second vehicle data could be used as ground truth to train the MLA to detect objects having less accurate representations in sensor data acquired in conditions similar to the second vehicle travelling behind the first vehicle.

It is contemplated that the present technology may be employed with different type of sensors mounted on vehicles, such as, but not limited, to cameras, LIDAR sensors and RADAR sensors and in different physical settings, where an MLA has been trained for object recognition or detection from data acquired in a first physical setting and may be exposed to data acquired in a second physical setting, where the representation of features of the objects are at least in part different. The physical setting may a factor having a physical effect on acquisition of data by the sensor (which may be environmental or due to distance for example).

In the second physical setting, less accurate representation of features or objects in sensor data (e.g. second vehicle data above) could still be perceived by a MLA in the second physical setting by having a basis for comparison (e.g. first vehicle data above) allowing to create training data for the MLA (e.g. by labelling the corresponding portions in the second vehicle data). Further, the present technology may be employed on more than one sensor at a time.

Thus, the present technology is directed to a method and a server for training a machine learning algorithm to detect objects at a distance.

In accordance with a first broad aspect of the present technology, there is provided a computer-implemented method for training a first machine-learning algorithm (MLA) to detect objects in sensor data acquired by a second sensor located at a second distance from the objects, the first MLA having been trained to recognize the objects in sensor data acquired by a first sensor located at a first distance from the objects, the second distance being greater than the first distance. The method is executed at a server, and comprises: receiving, by the server, first sensor data having been acquired at the first distance by the first sensor mounted on a first vehicle, the first vehicle having travelled on a predetermined road. The method comprises receiving, by the server, second sensor data having been acquired at the second distance by the second sensor mounted on a second vehicle, the second vehicle having travelled behind the first vehicle on the predetermined road. The method comprises receiving, by the server, a 3D map of the predetermined road, the 3D map including a set of objects. The method then comprises aligning, by the server, the first sensor data with the second sensor data based at least in part on the set of objects in the 3D map to obtain aligned first sensor data and aligned second sensor data, such that a given region in the aligned first sensor data corresponds to a given region in the aligned second sensor data. The first MLA determines respective portions in the aligned first sensor data corresponding to respective objects, where the determining includes determining respective classes of the respective objects. The method comprises assigning, by the server, the respective objects and the respective object classes to respective portions in the aligned second sensor data corresponding to the respective portions in the aligned first sensor data. The method comprises training, by the server, the first MLA to determine the objects and the respective object classes in given sensor data acquired at the second distance from the objects, where the training is based on: the respective portions of the aligned second sensor data, and the respective object classes assigned to the respective portions of the aligned second sensor data.

In some embodiments of the method, each object of the set of objects is associated with a respective location each point of the first sensor data is associated with a respective timestamp and a respective location, and each point of the second sensor data is associated with a respective timestamp and a respective location. The aligning is based on: respective timestamps of the first and second sensor data, respective locations of the first and second sensor data, and respective locations of the set of objects in the 3D map of the predetermined road.

In some embodiments of the method, each object of the set of objects is associated with a respective object class and the respective objects, and the respective object classes corresponding to the respective portions in the aligned first sensor data determined by the first MLA include the set of objects and the respective object classes in the 3D map of the predetermined road.

In some embodiments of the method, the 3D map of the predetermined road has been previously generated by: receiving, by the server, initial sensor data having been acquired at the first distance by a sensor mounted on the first vehicle, the first vehicle having travelled located on the predetermined road, each sensor data point being associated with a respective location, and respective odometer parameters. Areas of the initial sensor data are organized to obtain the 3D map, the organizing being based on the respective locations and respective odometer parameters, the organizing including geometrically aligning the areas of the initial sensor data. The first MLA determines the objects in the set of objects, the respective object classes, and the respective locations of the set of objects in respective areas of the 3D map.

In some embodiments of the method, the respective location includes: a latitude, and a longitude, and the respective odometer parameters include: gear, wheel rotation speed, inertial measurement unit (IMU) parameters, throttle, steering angle, and speed.

In some embodiments of the method, the aligning is executed by another MLA on the server, the other MLA implementing a clustering algorithm.

In some embodiments of the method, the first sensor is a first LIDAR sensor, and the second sensor is a second LIDAR sensor.

In some embodiments of the method, the server executes a third MLA, the third MLA having been trained to recognize objects in images acquired by a camera sensor. The method further comprises, prior to the aligning: receiving, by the server, a set of images having been acquired by a camera sensor mounted on the second vehicle, each image being associated with a respective location, and associating, by the third MLA, each image of the set of images with at least one respective object of the set of objects based at least in part on the respective location of the image and the respective location of the at least one respective object. The training the first MLA is further based on the set of images.

In some embodiments of the method, the server executes a fourth MLA, the fourth MLA having been trained to recognize objects in points acquired by a radar sensor. The method further comprises, prior to the aligning: receiving, by the server, radar sensor data having been acquired at the second distance by the radar sensor mounted on the second vehicle, each point of the radar sensor data being associated with a respective timestamp and a respective location. The aligning further comprises aligning the radar sensor data to obtain aligned radar sensor data, the aligning being further based on the respective locations of the radar sensor data, and the method further comprises, after the aligning: determining, by the fourth MLA, respective portions of the aligned radar sensor data corresponding to the respective objects, the determining including determining the respective object classes of the respective objects. The training the first MLA is further based on the radar sensor data In some embodiments of the method, the first MLA is a convolutional neural network (CNN).

In some embodiments of the method, the first MLA is a gradient boosting classification algorithm.

In some embodiments of the method, the first MLA has been trained by: receiving sensor data having been acquired at the first distance by the first sensor, the sensor data including a set of labelled objects. The sensor data is processed to extract a set of features, the features including a first set of parameters. The MLA is trained to determine a label for a given object based on the set of feature, the training being based on the set of labelled objects in the sensor data.

In accordance with another broad aspect of the present technology, there is provided a computer-implemented method for training a machine-learning algorithm (MLA) to detect objects in sensor data acquired by a second sensor in a second physical setting, the MLA having been trained to recognize the objects in sensor data acquired by a first sensor in a first physical setting, the objects in the sensor data acquired in the first physical setting having a different representation than the objects in the sensor data acquired in the second physical setting. The method is executed at a server and comprises: receiving first sensor data having been acquired in the first physical setting by the first sensor mounted on a first vehicle, the first vehicle having travelled on a predetermined road. The method comprises receiving second sensor data having been acquired in the second physical setting by the second sensor mounted on a second vehicle, the second vehicle having travelled on the predetermined road. The first sensor data is aligned with the second sensor data to obtain aligned first sensor data and aligned second sensor data in a single coordinate system such that a given region in the aligned first sensor data corresponds to a given region in the aligned second sensor data. The MLA determines respective portions in the aligned first sensor data corresponding to respective objects, the determining including determining respective classes of the respective objects. The method comprises assigning the respective objects and the respective object classes to respective portions in the aligned second sensor data corresponding to the respective portions in the aligned first sensor data. The method then comprises training, by the server, the MLA to determine the objects and the respective object classes in given sensor data acquired in the second physical setting, the training being based on: the respective portions of the aligned second sensor data, and the respective object classes assigned to the respective portions of the aligned second sensor data.

In accordance with yet another broad aspect of the present technology, there is provided a server for training a first machine-learning algorithm (MLA) to detect objects in sensor data acquired by a second sensor located at a second distance from the objects, the first MLA having been trained to recognize the objects in sensor data acquired by a first sensor located at a first distance from the objects, the second distance being greater than the first distance, the server comprising: a processor and a non-transitory computer-readable medium comprising instructions. The processor, upon executing the instructions, is configured to receive first sensor data having been acquired at the first distance by the first sensor mounted on a first vehicle, the first vehicle having travelled on a predetermined road, receive second sensor data having been acquired at the second distance by the second sensor mounted on a second vehicle, the second vehicle having travelled behind the first vehicle on the predetermined road. A 3D map of the predetermined road is received, the 3D map including a set of objects. The processor is configured to align the first sensor data with the second sensor data based at least in part on the set of objects in the 3D map to obtain aligned first sensor data and aligned second sensor data, such that a given region in the aligned first sensor data corresponds to a given region in the aligned second sensor data. The processor is configured to determine, via the first MLA, respective portions in the aligned first sensor data corresponding to respective objects, the determining including determining respective classes of the respective objects. The respective objects and the respective object classes are assigned to respective portions in the aligned second sensor data corresponding to the respective portions in the aligned first sensor data. The processor is configured to train the first MLA to determine the objects and the respective object classes in given sensor data acquired at the second distance from the objects, the training being based on: the respective portions of the aligned second sensor data, and the respective object classes assigned to the respective portions of the aligned second sensor data.

In some embodiments of the server, each object of the set of objects is associated with a respective location, each point of the first sensor data is associated with a respective timestamp and a respective location, and each point of the second sensor data is associated with a respective timestamp and a respective location. The aligning is based on the respective timestamps of the first and second sensor data, respective locations of the first and second sensor data, and respective locations of the set of objects in the 3D map of the predetermined road.

In some embodiments of the server, each object of the set of objects is associated with a respective object class the respective objects and the respective object classes corresponding to the respective portions in the aligned first sensor data determined by the first MLA include the set of objects and the respective object classes in the 3D map of the predetermined road.

In some embodiments of the server, the 3D map of the predetermined road has been previously generated by the processor by executing computer-readable instructions causing the processor to: receive initial sensor data having been acquired at the first distance by a sensor mounted on the first vehicle, the first vehicle having travelled located on the predetermined road, each sensor data point being associated with a respective location, and respective odometer parameters. The processor is configured to organize areas of the initial sensor data to obtain the 3D map, the organizing being based on the respective locations and respective odometer parameters, the organizing including geometrically aligning the areas of the third sensor data, and to determine, via the first MLA, the objects in the set of objects, the respective object classes, and the respective locations of the set of objects in respective areas of the 3D map.

In some embodiments of the server, the respective location includes: a latitude, and a longitude, and the respective odometer parameters include: gear, wheel rotation speed, inertial measurement unit (IMU) parameters, throttle, steering angle, and speed.

In some embodiments of the server, the aligning is executed by another MLA on the server, the other MLA implementing a clustering algorithm.

In some embodiments of the server the first sensor is a first LIDAR sensor, and the second sensor is a second LIDAR sensor.

In some embodiments of the server, the server executes a third MLA, the third MLA having been trained to recognize objects in images acquired by a camera sensor. The processor is further configured to, prior to the aligning: receive a set of images having been acquired by a camera sensor mounted on the second vehicle, each image being associated with a respective location, and associate, via the third MLA, each image of the set of images with at least one respective object of the set of objects based at least in part on the respective location of the image and the respective location of the at least one respective object. The training the first MLA is further based on the set of images.

In some embodiments of the server, the server executes a fourth MLA, where the fourth MLA has been trained to recognize objects in points acquired by a radar sensor, and the processor is further configured to, prior to the aligning: receive radar sensor data having been acquired at the second distance by the radar sensor mounted on the second vehicle, each point of the radar sensor data being associated with a respective timestamp and a respective location. The aligning further comprises aligning the radar sensor data to obtain aligned radar sensor data, the aligning being further based on the respective locations of the radar sensor data. The processor is further configured to, after the aligning: determine, via the fourth MLA, respective portions of the aligned radar sensor data corresponding to the respective objects, the determining including determining the respective object classes of the respective objects. The training the first MLA is further based on the third sensor data In some embodiments of the server, the first MLA is a convolutional neural network (CNN).

In some embodiments of the server, the first MLA is a gradient boosting classification algorithm.

In some embodiments of the server, the first MLA has been previously trained, by executing computer-readable instructions causing the processor to: receive sensor data having been acquired at the first distance by the first sensor, the sensor data including a set of labelled objects. The sensor data is processed to extract a set of features, the features including a first set of parameters. The MLA is trained to determine a label for a given object based on the set of feature, the training being based on the set of labelled objects in the sensor data.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
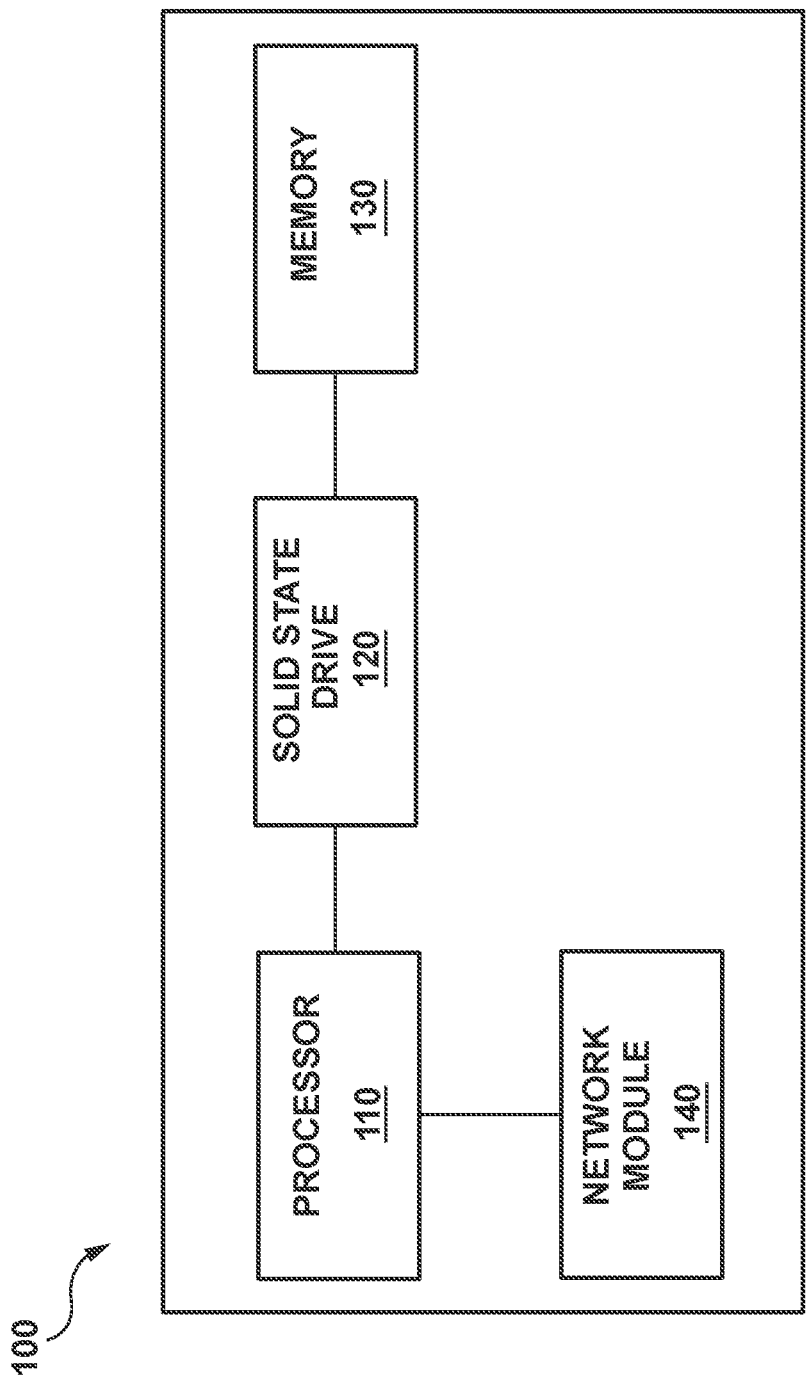
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Figure 2:
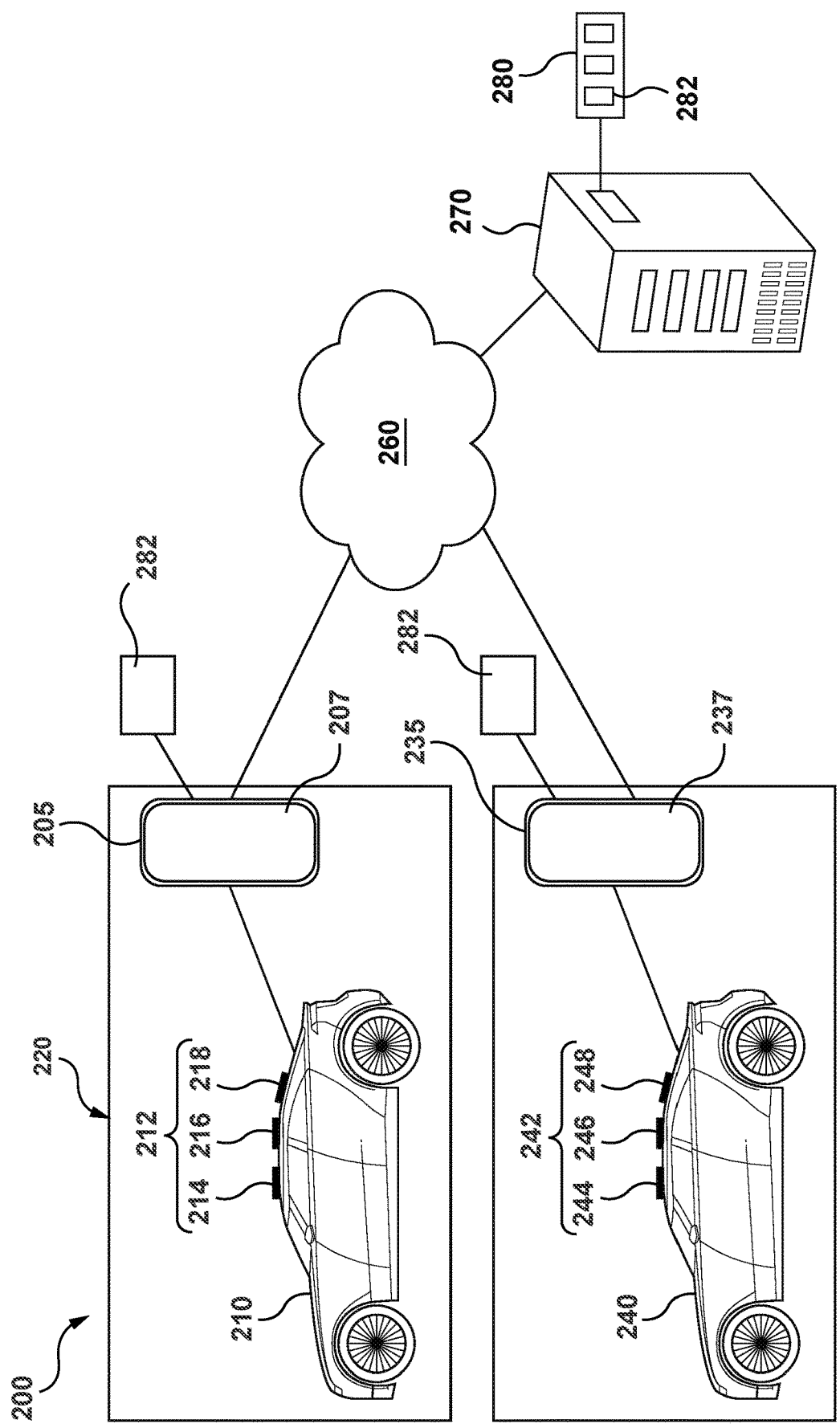
FIG. 2 depicts a networked computing environment being suitable for use in accordance with non-limiting embodiments of the present technology.

FIG. 2 illustrates a networked computer environment 200 suitable for use with some embodiments of the systems and/or methods of the present technology. The networked computer environment 200 comprises a first electronic device 205 associated with a first vehicle 210, or associated with a user (not depicted) who can operate the first vehicle 210, a second electronic device 235 associated with a second vehicle 240, or associated with a user (not depicted) who can operate the second vehicle 240, and a server 270 in communication with the first electronic device 205 via a communication network 260 (e.g. the Internet or the like, as will be described in greater detail herein below). Optionally, the networked computer environment 200 can also include a GPS satellite (not depicted) transmitting and/or receiving a GPS signal to/from the first electronic device 205. It will be understood that the present technology is not limited to GPS and may employ a positioning technology other than GPS. It should be noted that the GPS satellite can be omitted altogether.

First Vehicle

The first vehicle 210 to which the first electronic device 205 is associated respectively may comprise any leisure or transportation vehicle such as a private or commercial car, truck, motorbike or the like. The vehicle may be user operated or a driver-less vehicle. It should be noted that specific parameters of the first vehicle 210 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the first electronic device 205 is not particularly limited, but as an example, the first electronic device 205 may be implemented as a vehicle engine control unit, a vehicle CPU, a vehicle navigation device (e.g. TomTom™, Garmin™), a tablet, a personal computer built into the first vehicle 210 and the like. Thus, it should be noted that the first electronic device 205 may or may not be permanently associated with the first vehicle 210. Additionally or alternatively, the first electronic device 205 can be implemented in a wireless communication device such as a mobile telephone (e.g. a smart-phone or a radio-phone). In certain embodiments, the first electronic device 205 has a display 207.

The first electronic device 205 may comprise some or all of the components of the computer system 100 depicted in FIG. 1. In certain embodiments, the first electronic device 205 is on-board computer device and comprises the processor 110, solid-state drive 120 and the memory 130. In other words, the first electronic device 205 comprises hardware and/or software and/or firmware, or a combination thereof, for determining the presence of an object around the first vehicle 210, as will be described in greater detail below.

In accordance to the non-limiting embodiments of the present technology, the first electronic device 205 further comprises or has access to a first plurality of sensors 212. The first plurality of sensors includes a first sensor 214 configured to capture an image of a surrounding area 220 and a second sensor 216 configured to capture LIDAR data of the surrounding area 220. The first sensor 214 and the second sensor 216 are operatively coupled to the processor 110 for transmitting the so-captured information to the processor 110 for processing thereof, as will be described in greater detail herein below. In some embodiments of the present technology, the first electronic device 205 further comprises or has access to a third sensor 218 configured to capture RADAR data of the surrounding area 220 and operatively coupled to the processor 110 for transmitting so-captured information to the processor 110 for processing thereof.

First Plurality of Sensors

First Sensor

In a specific non-limiting example, the first sensor 214 comprises a camera. How the camera is implemented is not particularly limited. For example, in one specific non-limiting embodiments of the present technology, the camera can be implemented as a mono camera with resolution sufficient to detect objects at a predetermined distance of up to about 30 m (although cameras with other resolutions and ranges are within the scope of the present disclosure). The camera can be mounted on an interior, upper portion of a windshield of the first vehicle 210, but other locations are within the scope of the present disclosure, including on a back window, side windows, front hood, rooftop, front grill, or front bumper of the first vehicle 210. In some non-limiting embodiments of the present technology, the first sensor 214 can be mounted in a dedicated enclosure (not depicted) mounted on the top of the first vehicle 210.

In some non-limiting embodiments of the present technology, the first sensor 214 can be implemented as a plurality of cameras. For example, the plurality of cameras may have a sufficient number of cameras to capture a surrounding/panoramic image of the surrounding area 250.

In some embodiments of the present technology, the camera (or one or more cameras that make up the implementation of the first sensor 214) is configured to capture a pre-determined portion of the surrounding area 220 around the first vehicle 210. In some embodiments of the present technology, the camera is configured to capture an image (or a series of images) that represent approximately 90 degrees of the surrounding area 220 around the first vehicle 210 that are along a movement path of the first vehicle 210.

In other embodiments of the present technology, the camera is configured to capture an image (or a series of images) that represent approximately 180 degrees of the surrounding area 220 around the first vehicle 210 that are along a movement path of the first vehicle 210. In yet additional embodiments of the present technology, the camera is configured to capture an image (or a series of images) that represent approximately 360 degrees of the surrounding area 220 around the first vehicle 210 that are along a movement path of the first vehicle 210 (in other words, the entirety of the surrounding area around the first vehicle 210). In some embodiments of the present technology, the first sensor 214 may be implemented as an infrared camera.

In a specific non-limiting example, the first sensor 214 may be of the type available from FLIR Integrated Imaging Solutions Inc., 12051 Riverside Way, Richmond, BC, V6 W 1K7, Canada. It should be expressly understood that the first sensor 214 can be implemented in any other suitable equipment.

Second Sensor

In a specific non-limiting example, the second sensor 216 comprises a Light Detection and Ranging (LIDAR) instrument. Lidar stands for LIght Detection and Ranging. It is expected that a person skilled in the art will understand the functionality of the LIDAR instrument, but briefly speaking, a transmitter (not depicted) of the second sensor 216 implemented as the LIDAR sends out a laser pulse and the light particles (photons) are scattered back to a receiver (not depicted) the second sensor 216 implemented as the LIDAR instrument. The photons that come back to the receiver are collected with a telescope and counted as a function of time. Using the speed of light (~3×10$^8$ m/s), the processor 110 can then calculate how far the photons have traveled (in the round trip). Photons can be scattered back off of many different entities surrounding the first vehicle 210, such as other particles (aerosols or molecules) in the atmosphere, other card, stationary objects or potential obstructions in front of the first vehicle 210.

In a specific non-limiting example, the second sensor 216 may be of the type available from Velodyne LiDAR, Inc. of 5521 Hellyer Avenue, San Jose, Calif. 95138, United States of America. It should be expressly understood that the second sensor 216 can be implemented in any other suitable equipment.

In some embodiments of the present technology, the second sensor 216 can be implemented as a plurality of LIDAR based sensors, such as three for example, or any other suitable number. In some embodiments of the present technology, the second sensor 216 (whether implemented as a single LIDAR based sensor or multiple LIDAR based sensors) can be housed in the above-mentioned enclosure (not separately depicted) located on the roof of the first vehicle 210.

In those embodiments of the present technology, where the second sensor 216 is implemented as multiple LIDAR based sensors housed in the enclosure (not depicted), the spatial placement of the multiple LIDAR based sensors can be designed taking into account the specific technical configuration of the multiple LIDAR based sensors, configuration of the enclosure, weather conditions of the area where the first vehicle 210 is to be used (such as frequent rain, snow, and other elements) or the like.

Third Sensor

In a specific non-limiting example, the third sensor 218 comprises a RAdio Detection And Ranging (RADAR) instrument. Briefly speaking, a RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects. In alternative embodiments of the present technology, there may be a separate antenna for receiving waves, and a separate antenna for transmitting waves. The processor used for determining properties of surrounding objects may be the processor 110.

In some embodiments of then present technology, the third sensor 218 may comprise long-range, medium-range and short-range RADAR sensors. As a non-limiting example, the long-range RADAR sensor may be used for adaptive cruise control, Automatic emergency braking, and forward collision warning, while the medium and short-range RADAR sensors may be used for park assist, cross-traffic alert, junction assist, and blind side detection.

In a specific non-limiting example, the third sensor 218 may be of the type available from Robert Bosch GmbH of Robert-Bosch-Platz 1, 70839 Gerlingen, Germany. It should be expressly understood that the third sensor 218 can be implemented in any other suitable equipment.

In some embodiments of the present technology, the first sensor 214 and the second sensor 216 may be calibrated such that for the image captured by the first sensor 214 and the LIDAR data captured by the second sensor 216, the processor 110 is configured to identify a given region of the image that correspond to a given region of the LIDAR data captured by the third sensor 218. In other embodiments of the present technology, the first sensor 214, the second sensor 216, and the third sensor 218 are calibrated such that for the image captured by the first sensor 214, the LIDAR data captured by the second sensor 216, and the RADAR data captured by the third sensor 218, the processor 110 is configured to identify a given region of the image that correspond to a given region of the LIDAR data and the RADAR data.

The third sensor 218 may thus provide additional information to or enrich what is acquired by the first sensor 214 and/or second sensor 216. As a non-limiting example, it has been shown that in certain cases a RADAR sensor may perform better than a LIDAR instrument in particular weather conditions, such as fog, rain, snow, and dust. Further, a RADAR sensor may determine relative traffic speed or velocity of a moving object accurately using the Doppler frequency shift. Thus, the third sensor 218 may be used in combination with the first sensor 214, in combination with the second sensor 216, or in combination with the first sensor 214 and the second sensor 216. In some embodiments of the present technology, the third sensor 218 may only be used temporarily, such as in heavy weather condition for example.

Other Sensors

The first vehicle 210 further comprises or has access to other sensors (not depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the first vehicle 210.

As a non-limiting example, the IMU may be fixed to the first vehicle 210 and comprise three gyroscopes and three accelerometers for providing data on the rotational motion and linear motion of the first vehicle 210, which may be used to calculate motion and position of the first vehicle 210.

This calibration can be executed during the manufacturing and/or set up of the first vehicle 210. Or at any suitable time thereafter or, in other words, the calibration can be executed during retrofitting the first vehicle 210 with the first sensor 214, the second sensor 216, and the third sensor 218 in accordance with the non-limiting embodiments of the present technology contemplated herein. Alternatively, the calibration can be executed during equipping the first vehicle 210 with the first sensor 214 and the second sensor 216, and the third sensor 218 in accordance with the non-limiting embodiments of the present technology contemplated herein.

Second Vehicle

As with the first vehicle 210 associated with the first electronic device 205, the second vehicle 240 to which the second electronic device 235 is associated may comprise any leisure or transportation vehicle such as a private or commercial car, truck, motorbike or the like. The vehicle may be user operated or a driver-less vehicle. It should be noted that specific parameters of the second vehicle 240 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the second electronic device 235 is not particularly limited, but as an example, the second electronic device 235 may be implemented as a vehicle engine control unit, a vehicle CPU, a vehicle navigation device (e.g. TomTom™, Garmin™), a tablet, a personal computer built into the second vehicle 240 and the like. Thus, it should be noted that the second electronic device 235 may or may not be permanently associated with the second vehicle 240. Additionally or alternatively, the second electronic device 235 can be implemented in a wireless communication device such as a mobile telephone (e.g. a smart-phone or a radio-phone). In certain embodiments, the second electronic device 235 has a display 207.

The second electronic device 235 may comprise some or all of the components of the computer system 100 depicted in FIG. 1. In certain embodiments, the second electronic device 235 is on-board computer device and comprises the processor 110, solid-state drive 120 and the memory 130. In other words, the second electronic device 235 comprises hardware and/or software and/or firmware, or a combination thereof, for determining the presence of an object around the second vehicle 240, as will be described in greater detail below.

In accordance to the non-limiting embodiments of the present technology, the second electronic device 235 further comprises or has access to a second plurality of sensors 242. The second plurality of sensors includes a: a first sensor 244 configured to capture an image of a surrounding area 250 and a second sensor 246 configured to capture LIDAR data of the surrounding area 250. The first sensor 244 and the second sensor 246 are operatively coupled to the processor 110 for transmitting the so-captured information to the processor 110 for processing thereof, as will be described in greater detail herein below. In some embodiments of the present technology, the second electronic device 235 further comprises or has access to a third sensor 248 configured to capture RADAR data of the surrounding area 220 and operatively coupled to the processor 110 for transmitting so-captured information to the processor 110 for processing thereof.

Second Plurality of Sensors

First Sensor

In a specific non-limiting example, the first sensor 244 comprises a camera. How the camera is implemented is not particularly limited. For example, in one specific non-limiting embodiments of the present technology, the camera can be implemented as a mono camera with resolution sufficient to detect objects at a pre-determined distance of up to about 30 m (although cameras with other resolutions and ranges are within the scope of the present disclosure). The camera can be mounted on an interior, upper portion of a windshield of the second vehicle 240, but other locations are within the scope of the present disclosure, including on a back window, side windows, front hood, rooftop, front grill, or front bumper of the second vehicle 240. In some non-limiting embodiments of the present technology, the first sensor 244 can be mounted in a dedicated enclosure (not depicted) mounted on the top of the second vehicle 240.

In some non-limiting embodiments of the present technology, the first sensor 244 can be implemented as a plurality of cameras. For example, the plurality of cameras may have a sufficient number of cameras to capture a surrounding/panoramic image of the surrounding area 250.

In some embodiments of the present technology, the camera (or one or more cameras that make up the implementation of the first sensor 244) is configured to capture a pre-determined portion of the surrounding area 250 around the second vehicle 240. In some embodiments of the present technology, the camera is configured to capture an image (or a series of images) that represent approximately 90 degrees of the surrounding area 250 around the second vehicle 240 that are along a movement path of the second vehicle 240.

In other embodiments of the present technology, the camera is configured to capture an image (or a series of images) that represent approximately 180 degrees of the surrounding area 250 around the second vehicle 240 that are along a movement path of the second vehicle 240. In yet additional embodiments of the present technology, the camera is configured to capture an image (or a series of images) that represent approximately 360 degrees of the surrounding area 250 around the second vehicle 240 that are along a movement path of the second vehicle 240 (in other words, the entirety of the surrounding area around the second vehicle 240). In some embodiments of the present technology, the first sensor 244 may be implemented as an infrared camera.

In a specific non-limiting example, the first sensor 244 can be implemented as the camera may be of the type available from FLIR Integrated Imaging Solutions Inc., 12051 Riverside Way, Richmond, BC, V6 W 1K7, Canada. It should be expressly understood that the first sensor 244 can be implemented in any other suitable equipment.

Second Sensor

In a specific non-limiting example, the second sensor 246, similarly to the second sensor 216, comprises a LIDAR instrument.

In a specific non-limiting example, the second sensor 246 can be implemented as the LIDAR based sensor that may be of the type available from Velodyne LiDAR, Inc. of 5521 Hellyer Avenue, San Jose, Calif. 95138, United States of America. It should be expressly understood that the second sensor 246 can be implemented in any other suitable equipment.

In some embodiments of the present technology, the second sensor 246 can be implemented as a plurality of LIDAR based sensor, such as three for example or any other suitable number. In some embodiments of the present technology, the second sensor 246 (whether implemented as a single LIDAR based sensor or multiple LIDAR based sensors) can be housed in the above-mentioned enclosure (not separately depicted) located on the roof of the second vehicle 240.

In those embodiments of the present technology, where the second sensor 246 is implemented as multiple LIDAR based sensors housed in the enclosure (not depicted), the spatial placement of the multiple LIDAR based sensors can be designed taking into account the specific technical configuration of the multiple LIDAR based sensors, configuration of the enclosure, weather conditions of the area where the second vehicle 240 is to be used (such as frequent rain, snow, and other elements) or the like.

Third Sensor

In a specific non-limiting example, the third sensor 248, similarly to the third sensor 218, comprises a RADAR instrument.

In some embodiments of then present technology, the third sensor 248 may comprise long-range, medium-range and short-range RADAR sensors. As a non-limiting example, the long-range RADAR sensor may be used for adaptive cruise control, Automatic emergency braking, and forward collision warning, while the medium and short-range RADAR sensors may be used for park assist, cross-traffic alert, junction assist, and blind side detection.

In a specific non-limiting example, the third sensor 248 may be of the type available from Robert Bosch GmbH of Robert-Bosch-Platz 1, 70839 Gerlingen, Germany. It should be expressly understood that the third sensor 248 can be implemented in any other suitable equipment.

In some embodiments of the present technology, the first sensor 244 and the second sensor 246 are calibrated such that for the image captured by the first sensor 244 and the LIDAR data captured by the second sensor 246, the processor 110 is configured to identify a given region of the image that correspond to a given region of the LIDAR data. In other embodiments of the present technology, the first sensor 244, the second sensor 246, and the third sensor 248 are calibrated such that for the image captured by the first sensor 244, the LIDAR data captured by the second sensor 246, and the RADAR data captured by the third sensor 248, the processor 110 is configured to identify a given region of the image that correspond to a given region of the LIDAR data and the RADAR data.

The third sensor 248 may thus provide additional information to or enrich what is acquired by the first sensor 244 and/or second sensor 246. As a non-limiting example, it has been shown that a RADAR instrument may perform better than a LIDAR instrument in heavy weather conditions, such as fog, rain, snow, and dust. Further, a RADAR may determine relative traffic speed or velocity of a moving object accurately using the Doppler frequency shift. Thus, the third sensor 248 may be used in combination with the first sensor 244, in combination with the second sensor 246, or in combination with the first sensor 244 and the second sensor 246. In some embodiments of the present technology, the third sensor 248 may only be used temporarily, such as in heavy weather condition for example.

Other Sensors

The second vehicle 240 further comprises or has access to other sensors (not depicted). The other sensors include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the second vehicle 240.

As a non-limiting example, the IMU may be fixed to the second vehicle 240 and comprise three gyroscopes and three accelerometers for providing data on the rotational motion and linear motion of the second vehicle 240, which may be used to calculate motion and position of the second vehicle 240.

This calibration can be executed during the manufacturing and/or set up of the second vehicle 240. Or at any suitable time thereafter or, in other words, the calibration can be executed during retrofitting the second vehicle 240 with the first sensor 244, the second sensor 246 and the third sensor 248 in accordance with the non-limiting embodiments of the present technology contemplated herein. Alternatively, the calibration can be executed during equipping the second vehicle 240 with the first sensor 244, the second sensor 246 and the third sensor 248 in accordance with the non-limiting embodiments of the present technology contemplated herein.

Communication Network

In some embodiments of the present technology, the communication network 260 is the Internet. In alternative non-limiting embodiments, the communication network can be implemented as any suitable local area network (LAN), wide area network (WAN), a private communication network or the like. It should be expressly understood that implementations for the communication network are for illustration purposes only. How communication links (not separately numbered) between the first electronic device 205, the second electronic device 235 and the communication network 260 is implemented will depend inter alia on how the first electronic device 205 and the second electronic device 235 are implemented. Merely as an example and not as a limitation, in those embodiments of the present technology where the first electronic device 205 and the second electronic device 235 are implemented as a wireless communication device such as a smartphone or a navigation device, the communication link can be implemented as a wireless communication link. Examples of wireless communication links include, but are not limited to, a 3G communication network link, a 4G communication network link, and the like. The communication network 260 may also use a wireless connection with the server 270.

Server

In some embodiments of the present technology, the server 270 is implemented as a conventional computer server and may comprise some or all of the components of the computer system 100 of FIG. 1. In one non-limiting example, the server 270 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 270 may be distributed and may be implemented via multiple servers.

In some non-limiting embodiments of the present technology, the processor 110 of the first electronic device 205 can be in communication with the server 270 to receive one or more updates. The updates can be, but are not limited to, software updates, map updates, routes updates, weather updates, and the like. In some embodiments of the present technology, the processor 110 can also be configured to transmit to the server 270 certain operational data, such as routes travelled, traffic data, performance data, and the like.

Some or all data transmitted between the first vehicle 210 and the server 270 may be encrypted and/or anonymized.

Machine Learning Algorithms (MLAs)

One or more of the server 270, the first electronic device 205 and the second electronic device 235 may execute one or more MLAs.

The server 270 may execute a plurality of MLAs 280 that may be used to process data acquired by sensors such as the first plurality of sensors 212. The plurality of MLAs 280 may have been trained to perform one or more of segmentation, filtering, correction, matching, clustering, identification of objects, detection of objects, and classification of objects in images, LIDAR point clouds and RADAR point clouds.

The plurality of MLAs 280 includes a first MLA 282 that has been trained to perform object detection in LIDAR point clouds. In some embodiments of the present technology, the first MLA 282 may be implemented as an example by a neural network or a gradient boosted tree. The plurality of MLAs 280 may also include MLAs (not depicted) for each type of sensor data, i.e. RADAR data and images. It is contemplated that MLAs used for detection for each of the type of sensor data could be implemented by a single MLA.

As a non-limiting example, the first MLA 282 may be a neural network configured to classify objects corresponding to regions in 3D point cloud into one or more object classes. Object classes may include, but are not limited to: "vehicle", "car", "truck", "person", "animal", "tree", "building", "road", "lane", "road sign", "wall", "traffic light", and the like.

In one embodiment, the first MLA 282 may be configured to perform "one-class" type classification of objects. This means that the first MLA 282 may be configured to determine whether or not a given object is of a particular object class. For example, the first MLA 282 may be configured to determine whether or not the given object is of a "vehicle" class.

In other embodiments, the first MLA 282 may be configured to perform "multi-class" type classification of objects. This means that the first MLA 282 may be configured to determine which one of a plurality of object classes is to be associated with a given object. For example, the ODNN may be configured to determine which of "vehicle" class, "person" class, and "lane" class is to be associated with the given object.

In some embodiments of the present technology, the first MLA 282 has been trained by: receiving sensor data having been acquired at the first distance by a LIDAR sensor, the sensor data including a set of labelled objects. The objects may have been labelled by human assessors for example. The sensor data is processed to extract a set of features, which may include parameters such as sensor parameters, vehicle parameters and other types of parameters. The first MLA 282 is trained to determine a label (i.e. a class or category) for a given object based on the set of features, the training being based on the set of labelled objects in the sensor data. The first MLA 282 has been trained or another MLA may have been trained in a similar manner for other types of sensor data.

The first electronic device 205 and the second electronic device 235 may also execute MLAs which may include the first MLA 282. The first MLA 282 may be configured to perform object detection in real-time in a LIDAR 3d point cloud for example.

3D Map of Predetermined Road

Figure 3:
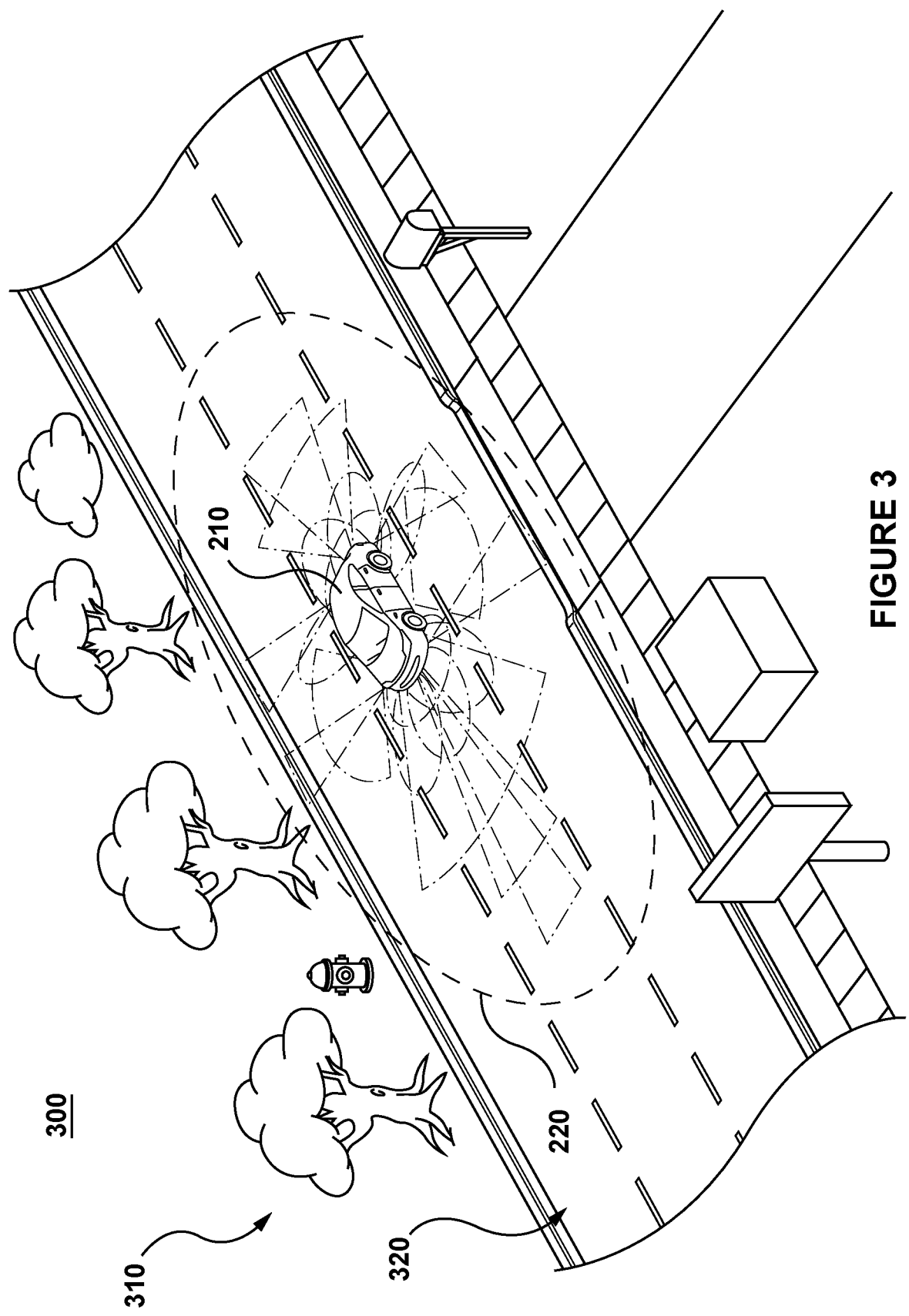
FIG. 3 and FIG. 4 depicts a 3D map generation procedure executed by the computer system of FIG. 1 in accordance with non-limiting embodiments of the present technology.
Figure 4:
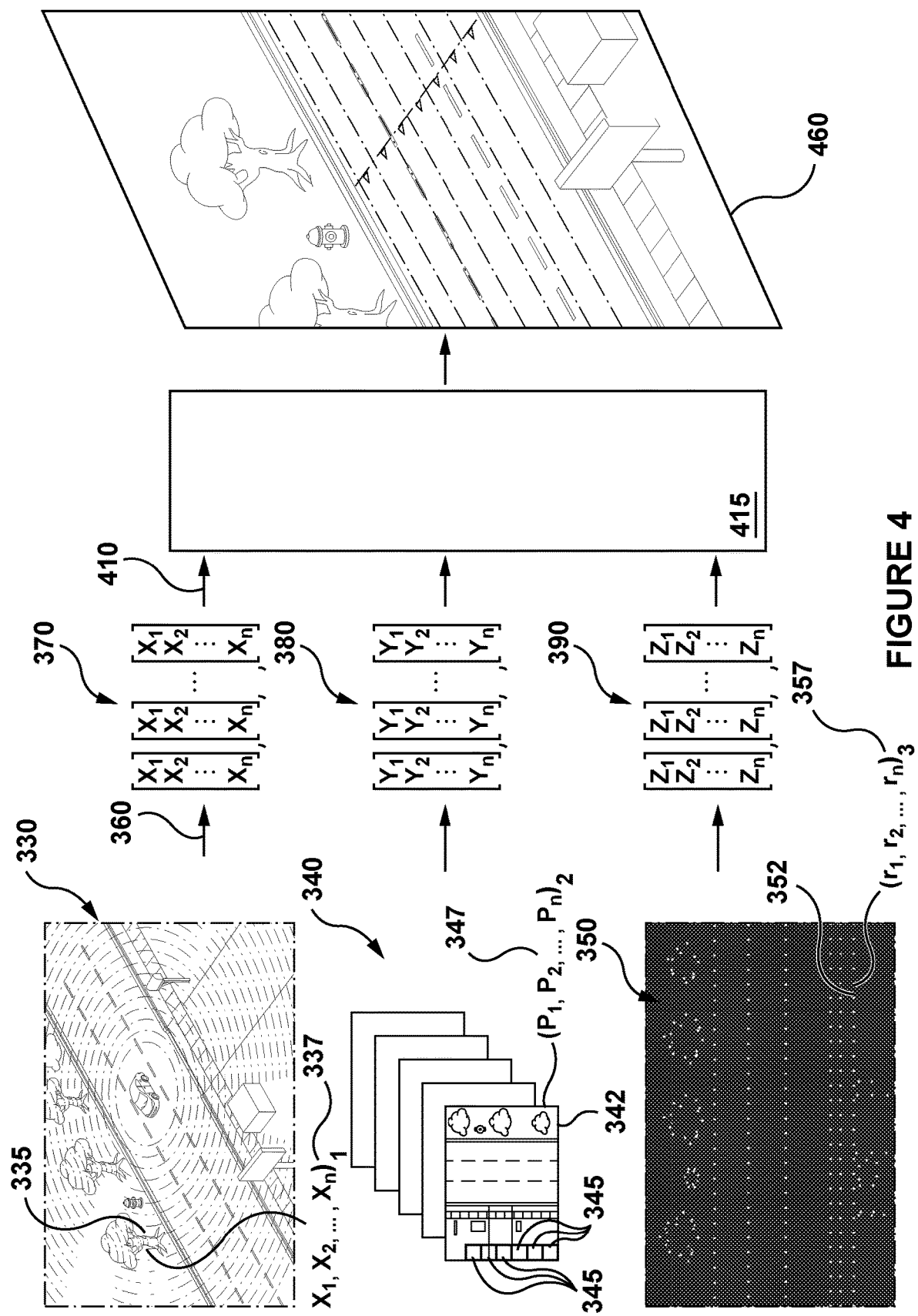

With reference to FIG. 3 and FIG. 4, there is depicted a schematic diagram of a 3D map generation procedure 300 in accordance with non-limiting embodiments of the present technology.

The 3D map generation procedure 300 includes a data acquisition procedure 310 and a data processing procedure 360 executed by the first electronic device 205 of the first vehicle 210, and a data fusion procedure 410 executed by the server 270.

Generally speaking, the purpose of the 3D map generation procedure 300 is to generate a 3D map 460 which provides a map of a predetermined road 320 that may be used by an autonomous vehicle (such as the first vehicle 210 or the second vehicle 240 for example) to predictably travel a predetermined road 320, by allowing the autonomous vehicle to acknowledge its own localization on the predetermined road 320, and by providing information about the environment and some surrounding object on the predetermined road 320 to the autonomous vehicle. It should be understood that the nature of the predetermined road 320 is not limited, and the predetermined road 320 may be any road that may be travelled by a vehicle.

It may be said that the 3D map 460 is meant to facilitate localization of the autonomous vehicle on the predetermined road 320, by having an electronic device onboard the AV (such as the first electronic device 205 onboard of the first vehicle 210) compare features of the surroundings with the 3D map 460 to locate itself. The 3D map 460 is meant to provide information about surrounding objects on the predetermined road 320, such as bounds of traffic lanes, traffic signs, traffic lights, position and height of curbs, for example, which may be used for path planning.

In some embodiments of the present technology, the 3D map 460 may be a self-driving high definition (HD) map The 3D map 460 is generated via the 3D map generation procedure 300, which includes the data acquisition procedure 310, the data processing procedure 360, and the data fusion procedure 410.

Data Acquisition Procedure

Generally speaking, the purpose of the data acquisition procedure 310 is to acquire data relative to the predetermined road 320 with at least a portion of the first plurality of sensors 212 such that the 3D map 460 of the predetermined road 320 can be generated after the data processing procedure 360 and the data fusion procedure 410. In some embodiments of the present technology, the data acquisition procedure 310 may be executed only when the predetermined road 320 is unoccupied, i.e. when there is no presence of other vehicles and/or persons on the predetermined road 320 (for example, at night). In other embodiments, the data acquisition procedure 310 may be executed with presence of regular traffic on the predetermined road 320.

The data acquisition procedure 310 is executed by the first electronic device 205 and the at least portion of the first plurality of sensors 212 of the first vehicle 210. In some embodiments of the present technology, the data acquisition procedure 310 may be executed by a plurality of electronic devices associated with respective vehicles (which may or may not include the first vehicle 210 and the second vehicle 240) equipped with one or more respective sensors. Additionally or alternatively, it is also contemplated that the data acquisition procedure 310 may be executed at least in part by an aerial vehicle, such as a drone or airplane, and/or a satellite.

To execute the data acquisition procedure 310, the first vehicle 210 travels on the predetermined road 320, and the first electronic device 205 is configured to acquire with at least a portion of the first plurality of sensors 212, data about the surrounding area 220 of the first vehicle 210 travelling on the predetermined road 320.

In the context of the present technology, the at least portion of the first plurality of sensors 212 includes at least the second sensor 216.

First Point Cloud Set

The first vehicle 210 travels on the predetermined road 320, and the first electronic device 205 is configured to cause the second sensor 216 to acquire data about the surrounding area 220 of the first vehicle 210 at different locations on the predetermined road 320.

The first electronic device 205 receives data about the surrounding area 220 of the first vehicle 210 at different locations on the predetermined road 320 in the form of LIDAR data 330.

Generally speaking, the LIDAR data 330 (FIG. 4) is a set of LIDAR 3D points in the form of a LIDAR point cloud, where each point 335 is a 3D point in space indicative of at least a portion of a given object on the predetermined road 320. In some embodiments of the present technology, the LIDAR data 330 may be organized in layers, where points in each layer are also organized in an elliptical fashion and the starting points of all elliptical layers are considered to share a similar orientation.

Each point 335 is associated with a first set of parameters 337. As a non-limiting example, the first set of parameters 337 may include: sensor parameters (i.e. data measured by the second sensor 216 or relating to the second sensor 216), vehicle parameters (i.e. data relative to the first vehicle 210), and other parameters.

The sensor parameters may include, as a non-limiting example: distance, intensity, and angle, as well as other parameters relating to LIDAR data.

The vehicle parameters may include, as a non-limiting example: latitude, longitude, gear, wheel rotation speed, inertial measurement unit (IMU) values (i.e. linear acceleration components and rotational rate components of the first vehicle 210), throttle, steering angle, and speed, as well as other parameters relating to the first vehicle 210 traveling on the predetermined road 320.

The other parameters may include, as a non-limiting example: a timestamp, and any other parameter that may be useful for processing the LIDAR data 330, such as weather conditions, and the like.

Plurality of Images

In some embodiments of the present technology, the first electronic device 205 is also configured to cause the first sensor 214 to acquire data about the surrounding area 220 of the first vehicle 210 in the form of a set of images 340. The set of images 340 are acquired concurrently with the LIDAR data 330, however, this does not need to be so in every embodiment of the present technology.

Generally speaking, the set of images 340 are optical images of the predetermined road 320. In other embodiments of the present technology, depending on how the first sensor 214 is implemented, the set of images may include infrared images of the predetermined road 320. The manner in which the set of images 340 are acquired, and a number of images in the set of images 340 are not limited. The set of images 340 may be acquired in a continuous manner (i.e. video) by the first sensor 214, or at pre-determined intervals, such as every 2 milliseconds or any other suitable time interval. In some embodiments of the present technology, the set of images 340 may be acquired by a plurality of sensors and/or by a plurality of vehicles.

As a non-limiting example, each image 342 of the set of images 340 may be a standard Red Green Blue (RGB) image, however it is contemplated that color models other than RGB may be used. Each image 432 includes a respective set of pixels 345 forming the image 342.

Each pixel (not numbered) of the respective set of pixels 345 of an image 342 of the set of images 340 is associated with a set of image parameters 347. The set of image parameters 347 includes optical parameters (i.e. data measured by the first sensor 214 or relating to the first sensor 214), vehicle parameters (i.e. relative to the vehicle on which the sensors are mounted on), and other parameters. In other embodiments of the present technology, each image 342 may also be associated with a set of image parameters (not depicted).

The optical parameters may include, as a non-limiting example: RGB values, pixel position, image metadata, as well as other parameters relating to camera.

The vehicle parameters may include, as a non-limiting example: latitude, longitude, gear, wheel rotation speed, inertial measurement unit (IMU) values (i.e. linear acceleration components and rotational rate components of the first vehicle 210), throttle, steering angle, and speed, as well as other parameters relating to the first vehicle 210 traveling on the predetermined road 320.

The other parameters may include a timestamp, and any other parameter that may be useful for processing the LIDAR data 330, such as weather conditions, and the like.

Second Point Cloud Set

In some embodiments of the present technology, the first electronic device 205 is configured to cause the third sensor 218 to acquire data about the surrounding area 220 of the first vehicle 210 in the form of RADAR data 350 of the predetermined road 320. It should be noted that in alternative embodiments of the present technology, data from the third sensor 218 may be acquired in a form other than a point cloud.

In some embodiments of the present technology, the RADAR data 350 may be acquired concurrently with LIDAR data 330. The RADAR data 350 may be acquired in a continuous manner, or at pre-determined intervals, such every 2 milliseconds or any other suitable time interval. In some embodiments of the present technology, the RADAR data 350 may be acquired by a plurality of sensors and/or by a plurality of vehicles.

Generally speaking, the RADAR data 350 is a set of RADAR data points in space acquired by the third sensor 218, where each point 352 is associated with a second set of parameters 357. In some embodiments of the present technology, the RADAR data 350 may be in the form of 2D points. In other embodiments of the present technology the RADAR data 350 may be in the form of a 3D point cloud. As a non-limiting example, the second set of parameters 357 may include: sensor parameters (i.e. data measured by the third sensor 218 or relating to the third sensor 218), vehicle parameters (i.e. relating to the first vehicle 210), and other parameters.

As a non-limiting example, the sensor parameters may include: speed, distance, signal strength, horizontal angle, vertical angle, frequency, bandwidth, range, accuracy, cycle as well as other parameters relating to RADAR instruments.

The vehicle parameters may include, as a non-limiting example: latitude, longitude, gear, wheel rotation speed, inertial measurement unit (IMU) values (i.e. linear acceleration components and rotational rate components of the first vehicle 210), throttle, steering angle, and speed, as well as other parameters relating to the first vehicle 210 traveling on the predetermined road 320.

The other parameters may include any parameter that may be useful for processing the RADAR data 350, such as weather conditions, and the like.

The first vehicle 210 may travel on the predetermined road 320 several times, at different speeds, in different conditions and/or along different possible paths to acquire each of the LIDAR data 330, the set of images 340, and the RADAR data 350. It is contemplated that a plurality of vehicles equipped with sensors may perform the data acquisition procedure 310.

After completion of the data acquisition procedure 310, the set of images 340, the LIDAR data 330, and the RADAR data 350 may be transmitted by the first electronic device 205 to the server 270.

Data Processing Procedure

The data processing procedure 360 is executed by the processor 110 of the server 270.

The server 270 receives the set of images 340, the LIDAR data 330, and the RADAR data 350.

The server 270 is configured to execute the data processing procedure 360 based on the set of image parameters 347 of the set of images 340, the first set of parameters 337 of the LIDAR data 330, and the second set of parameters 357 of the RADAR data 350.

Generally speaking, the purpose of the data processing procedure 360 is to process the set of images 340, the LIDAR data 330, and the RADAR data 350 of the predetermined road 320 to obtain a processed set of images 370, a processed LIDAR data 380, and a processed RADAR data 390, such that each of the processed set of images 370, the processed LIDAR data 380, and the processed RADAR data 390 are aligned temporally and spatially. The data processing procedure 360 may include extraction of features from each of the set of images 340, the LIDAR data 330, and the RADAR data 350.

It could be said that the data processing procedure 360 is for organizing the set of images 340, the LIDAR data 330, and the RADAR data 350. Optimization methods may be used for organizing the set of images 340, the LIDAR data 330, and the RADAR data 350.

The data processing procedure 360 may include one or more of: segmentation, filtering, correction, matching, clustering, detection of objects, and classification of objects in the set of images 340, the LIDAR data 330, and the RADAR data 350.

The server 270 is configured to execute the data processing procedure 360 based on the set of image parameters 347 of the set of images 340, the first set of parameters 337 of the LIDAR data 330, and the second set of parameters 357 of the RADAR data 350.

In other embodiments of the present technology, the data processing procedure 360 may be executed individually for each of the set of images 340, the LIDAR data 330, and the RADAR data 350, i.e. information from the set of images 340, the LIDAR data 330, and the RADAR data 350 may be treated separately before being combined at the data fusion procedure 410. In some embodiments of the present technology, the data processing procedure 360 for a given one of the set of images 340, the LIDAR data 330, and the RADAR data 350 may be executed by combining information from at least another one of the set of images 340, the LIDAR data 330, and the RADAR data 350 at various stages to enrich the processing thereof.

An example of a method and a system for processing images and LIDAR data is disclosed in a co-owned Russian Federation Patent Application No. 2018132850 entitled "METHODS AND SYSTEMS FOR COMPUTER-BASED DETERMINING OF PRESENCE OF OBJECTS", the content of which is incorporated by reference herein in its entirety As an example, the server 270 can be configured to align the set of images 340, the LIDAR data 330, and the RADAR data 350 based on their respective timestamps in the set of image parameters 347, the first set of parameters 337, and the second set of parameters 357. The server 270 is configured to align the set of images 340, the LIDAR data 330, and the RADAR data 350 by transferring sensed information into a single coordinate system. As a non-limiting example, the alignment into a single coordinate system of the set of images 340, the LIDAR data 330, and the RADAR data 350 may be performed based on GPS parameters, timestamps, vehicle parameters (e.g. x, y, z, position parameters and roll, pitch, and yaw altitude parameters) and other parameters in the set of image parameters 347, the first set of parameters 337, and the second set of parameters 357.

As a non-limiting example, the server 270 may be configured to process the set of images 340 based on the set of image parameters 347 to adjust exposure, gain, perform camera calibration, and image rectification. The server 270 may be configured to execute a standard detection pipeline which includes preprocessing, region of interest (ROI) extraction, and object classification of the set of images 340.

Non-limiting examples of techniques used to process the set of images 340 include: Scale-Invariant Feature Transform (SIFT), Histogram of Oriented Gradients (HOG), Discriminatively Trained Part Based Models (DPM), Support Vector Machines (SVM), and Neural Networks.

The server 270 is configured to perform object detection and/or object recognition based on the set of image parameters 347 during the data processing procedure 360. Briefly speaking, object detection consists in determining presence of an object, i.e. discern an object from the background, while object recognition consists in identifying what the object is, i.e. classify the object.

To do so, the server 270 may execute the plurality of MLAs 280.

The server 270 outputs processed set of images 370, which may as an example include information about a set of objects (not depicted) identified on the predetermined road 320. The information may include as an example approximate size, class, of a given object in the set of objects (not depicted).

The server 270 is configured to process the LIDAR data 330 acquired by the second sensor 216 based on the first set of parameters 337 to obtain the processed LIDAR data 380.

In some embodiments of the present technology, the server 270 may be configured to process the LIDAR data 330 in different plane projections, such as a "bird's eye view" of the LIDAR data 330, which may be obtained by discarding the z coordinate. Plane projections may allow a reduction in dimensionality, which in turn may permit an easier feature extraction process.

In some embodiments of the present technology, the LIDAR data 330 may be segmented into a foreground and a background, which may be done by clustering points with similar characteristics into homogenous regions, such that regions may be subsequently analyzed. As a non-limiting example, the server 270 may be configured to execute segmenting for rejecting points corresponding to the ground, and then cluster the remaining points to form objects.

As a non-limiting example, the segmentation of the LIDAR data 330 may be performed via edge based methods, region based methods, attribute based methods, model based methods, graph based methods or any other method known in the art.

The clustering of the LIDAR data 330 may be performed using algorithms such as DBSCAN (Density-Based Spatial Clustering of Applications with Noise), Euclidean cluster extraction, and MeanShift.

The server 270 may then classify the clustered objects by accessing the first MLA 282.

In some embodiments of the present technology, the server 270 may be configured to use features or information extracted during the data processing of the set of images 340 during data processing of the LIDAR data 330, such as during segmentation and/or object classification.

The server 270 outputs the processed LIDAR data 380, which may as an example includes information about a set of objects (not depicted) identified on the predetermined road 320. The information may include as an example approximate location, size, class, of a given object in the set of objects (not depicted).

The set of objects (not depicted) identified may be different from the set of object (not depicted) in the processed set of images 370, as the nature of the first sensor 214 and the second sensor 216 is different, and one of the first sensor 214 and the second sensor 216 may detect objects that have not been detected by the other one of the first sensor 214 and the second sensor 216.

The server 270 is configured to process the RADAR data 350 acquired by the third sensor 218 based on the second set of parameters 357 to obtain the processed RADAR data 390.

It is contemplated that points in the LIDAR data 330, and the RADAR data 350 may be geometrically aligned based on the set of images 340 such that a given object represented in the LIDAR data 330 and the RADAR data 350 is located in a single location in a single coordinate system.

In other embodiments of the present technology, the server 270 may use the RADAR data 350 to enrich the LIDAR data 330, and may not necessarily process the RADAR data 350 in its entirety.

In other embodiments of the present technology, it is contemplated that each the set of images 340, the LIDAR data 330, and the RADAR data 350 may be processed separately, and objects and categories may be matched after.

Once the data processing procedure 360 is executed, the server 270 executes the data fusion procedure 410.

Data Fusion Procedure

The data fusion procedure 410 is executed by the server 270, where information extracted and processed from the first plurality of sensors 212 in the form of the processed set of images 370, the processed LIDAR data 380, and the processed RADAR data 390 is combined to achieve a gain in information about the predetermined road 320, as opposed to using data from each of the first plurality of sensors 212 individually. The data fusion procedure 410 allows improving accuracy and reliability of data acquired by the first plurality of sensors 212. The server 270 is configured to generate the 3D map 460 of the predetermined road 320 at the end of the data fusion procedure 410.

The manner in which the data fusion procedure 410 is executed is not limited, and depends on how the data processing procedure 360 is executed. In some embodiments of the present technology, the data fusion procedure 410 is executed by a data fusion algorithm 415 and to confirm presence of objects on the predetermined road 320 by assigning probability scores to the objects in each of the processed set of images 370, the processed LIDAR data 380, and the processed RADAR data 390 to determine their respective classes.

In some embodiments of the present technology, during the data fusion procedure 410, the data fusion algorithm may be based on filter methods (e.g. Kalman filters, particle filters), or optimization methods (e.g. graph optimization).

As a non-limiting example, several types of Kalman filters may be used during the data fusion procedure 410. Kalman filters may be used to estimate variables that cannot be measured directly, and/or to estimate a variable by combining measurements from multiple sensors.

In some embodiments of the present technology, the 3D map 460 of the predetermined road 320 may be divided into a plurality of layers (not depicted) based at least in part on the set of objects (not depicted). As a non-limiting example, the plurality of layers may include a road-level network layer, global dynamic layer (e.g. including dynamic information such as traffic, weather, construction, etc.), lane layer, virtual sensor layer, and obstacle layer.

As it may be understood by a person skilled in the art, the 3D map 460 of the predetermined road 320 may not necessarily be a graphical representation of the predetermined road 320, but a data representation of the predetermined road 320 that may be used by an electronic device for facilitating travel of the autonomous vehicle on the predetermined road 320.

It is contemplated that information from other sources (such as from official sources) and from other sensors may be used to enrich the 3D map 460. Further, the 3D map 460 of the predetermined road 320 maybe generated in whole or in part by the server 270, and may be acquired from another source.

The 3D map 460 of the predetermined road 320 may then be used by any autonomous vehicle to assist in localization and object detection on the predetermined road 320.

The 3D map 460 may be generated at predetermined periods of time (such as every week or month) or upon receiving an indication (from a user or authorities for example) to take into account recent changes to the predetermined road (such as presence of road blocks, debris, accidents, construction, etc.).

Figure 5:
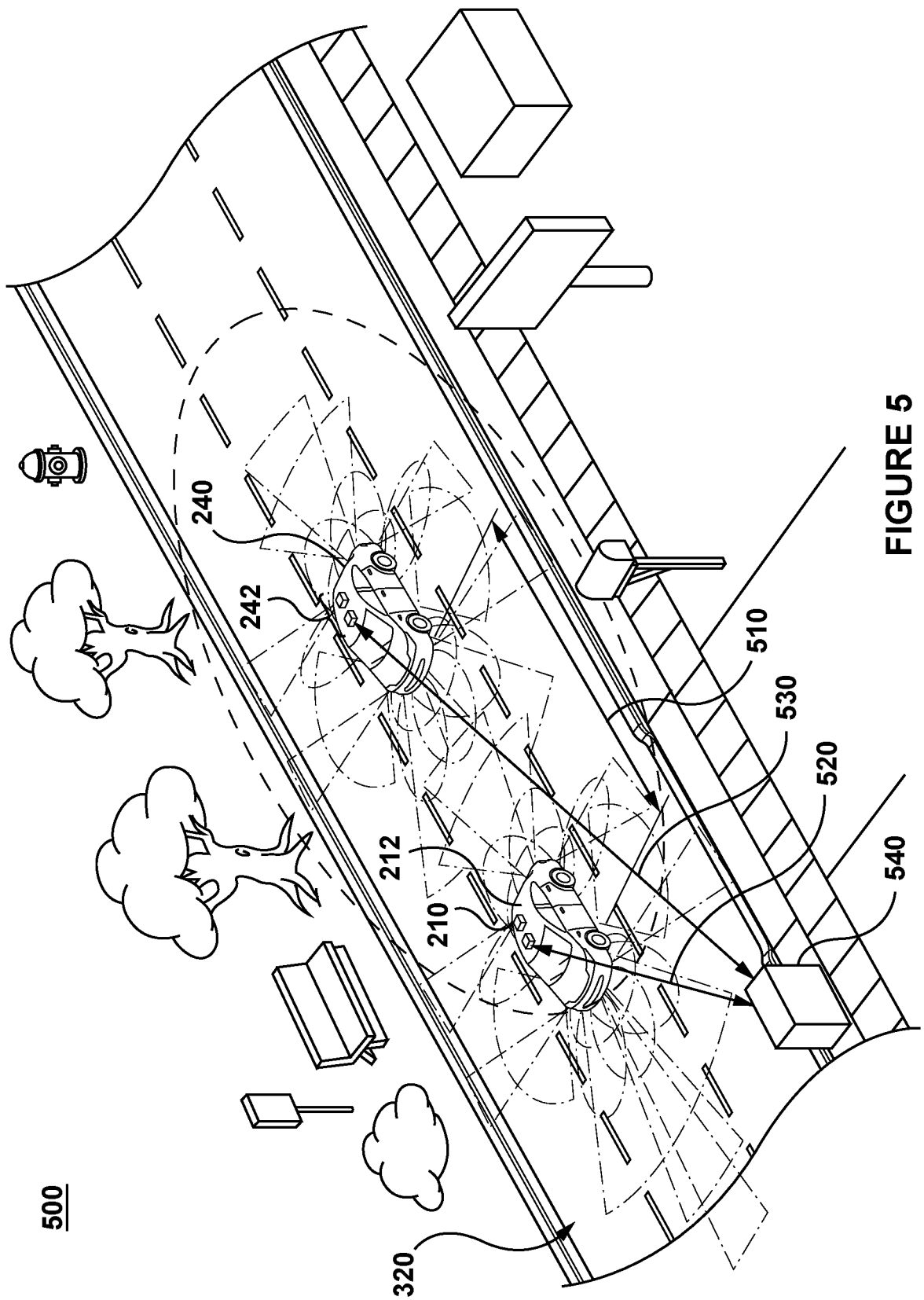
FIG. 5 depicts a schematic diagram of two-vehicle data acquisition procedure in accordance with non-limiting embodiments of the present technology.

Having explained, with reference to FIGS. 3 and 4, how the 3D map of the predetermined road 320 is generated, we shall now describe, with reference to FIG. 5, a two-vehicle data acquisition procedure 500 in accordance with non-limiting embodiments of the present technology.

Two-Vehicle Data Acquisition Procedure

The two-vehicle data acquisition procedure 500 is executed by the first electronic device 205, the second electronic device 235, and the server 270.

Generally speaking, the purpose of the two-vehicle data acquisition procedure 500 is to acquire sensor data on the predetermined road 320 with at least a portion of the first plurality of sensors 212 on the first vehicle 210, and at least a portion of the second plurality of sensors 242 on the second vehicle 240, where the second vehicle 240 is constantly located at a distance from the first vehicle 210. It should be noted that sensors from the first plurality of sensors 212 and sensors from the second plurality of sensors 242 being used during two-vehicle data acquisition procedure 500 should be corresponding, e.g. if a LIDAR instrument is used on the first vehicle 210, a LIDAR instrument should be used on the second vehicle 240, i.e. the second sensor 216 and the second sensor 246.

As explained herein above, data about the surrounding environment that is acquired by at least a portion of the second plurality of sensors 242 of the second vehicle 240, which is travelling within a distance 510 behind the first vehicle 210, may be less accurate than sensor data acquired by the first plurality of sensors 212 of the first vehicle 210 for a variety of reasons, such as nature of sensors, distance, scattering, interference, diffraction, diffusion, presence of obstacles, and the like. Thus, by having simultaneous acquisition of data by the portion of the first plurality of sensors 212 of the first vehicle 210 and the portion of the second plurality of sensors 242 of the second vehicle 240 travelling within the distance 510 behind the first vehicle 210, the first MLA 282 executed by the first electronic device 205 and the second electronic device 235 may be subsequently trained to detect objects that are represented less accurately in sensor data acquired at a distance by the second plurality of sensors 242. For ease of data processing, the first vehicle 210 and the second vehicle 240 may generally travel at the same speed, however it does not need to be so in every embodiment of the present technology.

Generally speaking, the two-vehicle data acquisition procedure 500 may be executed in a manner similar to the data acquisition procedure 310 of the map generation procedure 300 of FIG. 3.

Initially, time may be synchronised between the first vehicle 210 and the second vehicle 240, as an example via the first electronic device 205 and the second electronic device 235.

The first vehicle 210 may travel on the predetermined road 320, and the second vehicle 240 may travel within the distance 510 behind the first vehicle 210. It should be understood that the first vehicle 210 and/or the second vehicle 240 may have a driver, may be travelling in semi-autonomous or autonomous mode.

While travelling on the predetermined road 320, the first electronic device 205 acquires, via at least a portion of the first plurality of sensors 212, first vehicle sensor data 610 about the predetermined road 320. The first vehicle sensor data 610 generally includes at least a first vehicle LIDAR data 612 acquired by the second sensor 246.

Each point (not numbered) in the first vehicle LIDAR data 612 is associated with respective first vehicle LIDAR parameters 622, which are of the same nature as the first set of parameters 337, i.e. the respective first vehicle LIDAR parameters 622 may include: sensor parameters (i.e. data measured by the second sensor 216 or relating to the second sensor 216), vehicle parameters (i.e. data relative to the first vehicle 210), and other parameters.

The sensor parameters may include, as a non-limiting example: distance, intensity, and angle, as well as other parameters relating to LIDAR data.

The vehicle parameters may include, as a non-limiting example: latitude, longitude, gear, wheel rotation speed, inertial measurement unit (IMU) values (i.e. linear acceleration components and rotational rate components of the first vehicle 210), throttle, steering angle, and speed, as well as other parameters relating to the first vehicle 210 traveling on the predetermined road 320.

The other parameters may include, as a non-limiting example: a timestamp, and any other parameter that may be useful for processing the first vehicle LIDAR data 612, such as weather conditions, and the like.

In some embodiments of the present technology, the first vehicle sensor data 610 further includes a first set of images 614 acquired by the first sensor 214 and/or a first vehicle RADAR data 616 acquired by the third sensor 218. Each pixel and/or image may be associated with respective first image parameters 624, and each point of the first vehicle RADAR data 616 may be associated with respective second vehicle RADAR parameters 626.

Likewise, the second electronic device 235 acquires, via at least a portion of the second plurality of sensors 242, second vehicle sensor data 630 about the predetermined road 320. The second vehicle sensor data 630 generally includes at least a second vehicle LIDAR data 632 acquired by the second sensor 246.

Each point (not numbered) in the second vehicle LIDAR data 632 is associated with respective second vehicle LIDAR parameters 642, which are of the same nature as the first set of parameters 337, i.e. the second vehicle LIDAR parameters 642 may include: sensor parameters (i.e. data measured by the second sensor 246 or relating to the second sensor 246), vehicle parameters (i.e. data relative to the second vehicle 240), and other parameters.

The sensor parameters may include, as a non-limiting example: distance, intensity, and angle, as well as other parameters relating to LIDAR data.

The vehicle parameters may include, as a non-limiting example: GPS latitude and longitude, gear, wheel rotation speed, inertial measurement unit (IMU) values (i.e. linear acceleration components and rotational rate components of the second vehicle 240), throttle, steering angle, and speed, as well as other parameters relating to the second vehicle 240 traveling on the predetermined road 320.

The other parameters may include, as a non-limiting example: a timestamp, and any other parameter that may be useful for processing the second vehicle LIDAR data 632, such as weather conditions, and the like.

In some embodiments of the present technology, the second vehicle sensor data 630 further includes a second set of images 634 acquired by the first sensor 244 and/or a second vehicle RADAR data 636 acquired by the third sensor 248. Each pixel and/or image of the second set of images 634 may be associated with respective second image parameters 644, and each point of the second vehicle RADAR data 636 may be associated with respective second vehicle RADAR parameters 646.

Generally speaking, it may be said that a given object 540 (or a portion thereof) sensed by the at least portion of the first plurality of sensors 212 on the predetermined road 320 is located at a first distance 520 from the at least portion of the first plurality of sensors 212. The given object 540 sensed by the at least of the second plurality of sensors 242 on the predetermined road 320 is located at a second distance 530 from the at least of the second plurality of sensors 242. As it may be understood, the second distance 530 is greater than the first distance 520.

In some embodiments, acquisition of data by the portion of the first plurality of sensors 212 and the second plurality of sensors 242 may be executed at the same time intervals.

It should be understood that the two-vehicle data acquisition procedure 500 may be repeated numerous times, at different speeds and different conditions, such that enough data is acquired for training the first MLA 282.

The first electronic device 205 and the second electronic device 235 respectively transmit the first vehicle sensor data 610 and the second vehicle sensor data 630 to the server 270.

Figure 6:
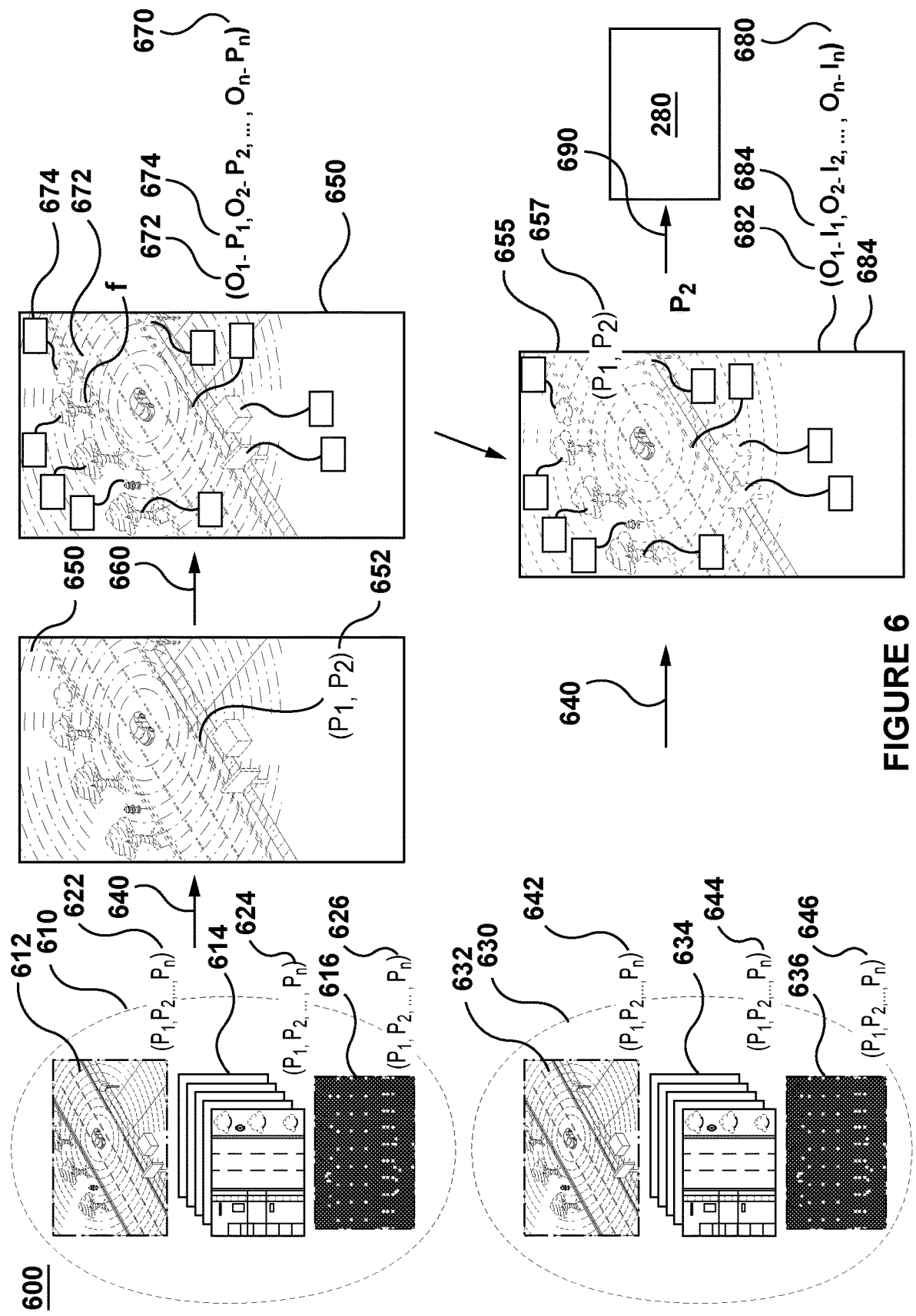
FIG. 6 depicts a schematic diagram of two-vehicle data processing procedure in accordance with non-limiting embodiments of the present technology.

With reference to FIG. 6, there is depicted a schematic diagram of a two-vehicle data processing procedure 600 in accordance with non-limiting embodiments of the present technology.

The two-vehicle data processing procedure 600 is executed by the server 270 after the two-vehicle data acquisition procedure 500.

The two-vehicle data processing procedure 600 includes a two-vehicle alignment procedure 640, an object detection procedure 660, and a training procedure 690.

Two-vehicle alignment procedure

The server 270 receives the first vehicle sensor data 610 and the second vehicle sensor data 630 from the first electronic device 205 and the second electronic device 235 respectively.

The server 270 acquires the 3D map 460 from a volatile or non-volatile memory, such as memory 130.

The server 270 is configured to execute the two-vehicle alignment procedure 640 based on the 3D map 460 and at least the first vehicle LIDAR data 612 of the first vehicle sensor data 610 and the second vehicle LIDAR data 632 of the second vehicle sensor data 630.

Generally speaking, the purpose of the two-vehicle alignment procedure 640 is to synchronise or align the first vehicle sensor data 610 and the second vehicle sensor data 630 to obtain an aligned first vehicle sensor data 650 and an aligned second vehicle sensor data 655 respectively, such that the first vehicle sensor data 610 and the second vehicle sensor data 630 are represented in a single coordinate system, where a given region from the aligned first vehicle sensor data 650 corresponds to a given region in the aligned second vehicle sensor data 655. In some embodiments of the present technology, the first vehicle sensor data 610 and the second vehicle sensor data 630 may be aligned based on their respective GPS locations, timestamps, IMU values, and odometer parameters and features of the 3D map 460.

The server 270 is also configured to synchronise temporally the first vehicle sensor data 610 and the second vehicle sensor data 630.

In the context of some of the non-limiting embodiments of the present technology, the first set of images 614 acquired by the first sensor 214 and the first vehicle RADAR data 616 acquired by the third sensor 218 are used to enrich the first vehicle LIDAR data 612 acquired by the second sensor 216, i.e. the first vehicle RADAR data 616 is the main representation of the predetermined road 320. Similarly, the second set of images 634 acquired by the first sensor 244 and/or the second vehicle RADAR data 636 acquired by the third sensor 248 are used to enrich the second vehicle LIDAR data 632.

The two-vehicle alignment procedure 640 may be executed in a manner similar to the data processing procedure 360, and may include segmentation, filtering, correction, matching, and clustering of the first vehicle sensor data 610 and the second vehicle sensor data 630.

The two-vehicle alignment procedure 640 may also include a sensor fusion procedure (not depicted), which may be executed in a manner similar to the data fusion procedure 410, without generating a 3D map.

The output of the two-vehicle alignment procedure 640 is the aligned first vehicle sensor data 650, where each point (not numbered) is associated with first aligned parameters 652 and the aligned second vehicle sensor data 655, where each point (not numbered) is associated with second aligned parameters 657. A given region from the aligned first vehicle sensor data 650 corresponds to a given region in the aligned second vehicle sensor data 655.

Object Detection Procedure

The server 270 executes the first MLA 282 for performing an object detection procedure 660 in the aligned first vehicle sensor data 650 based on the first aligned parameters 652.

As stated previously, the first MLA 282 has been trained to perform object detection in LIDAR instrument data.

The First MLA 282 outputs an indication of a set of detected objects 670, the set of detected objects 670 having been detected in the aligned first vehicle sensor data 650. Each detected object 672 corresponds to a portion of the aligned first vehicle sensor data 650 (i.e. a number of points in the LIDAR point cloud) and is associated with a respective class label 674.

Training Procedure

The server 270 is configured to label a given portion 682 in the aligned second vehicle sensor data 655 with a respective class label 684, where the given portion 682 corresponds to the detected object 672 and its respective class label 674 in the set of detected objects 670.

The server 270 generates a set of training objects 680 for the aligned second vehicle sensor data 655.

The server 270 is configured to train the first MLA 282 on the set of training objects 680, such that the first MLA 282 may be able to detect objects in a point cloud acquired at the second distance 530 by a LIDAR instrument, such as the second sensor 246.

It is contemplated that the two-vehicle data processing procedure 600 may be repeated numerous times, where data may be acquired by the second vehicle 240 at different distances.

Figure 7:
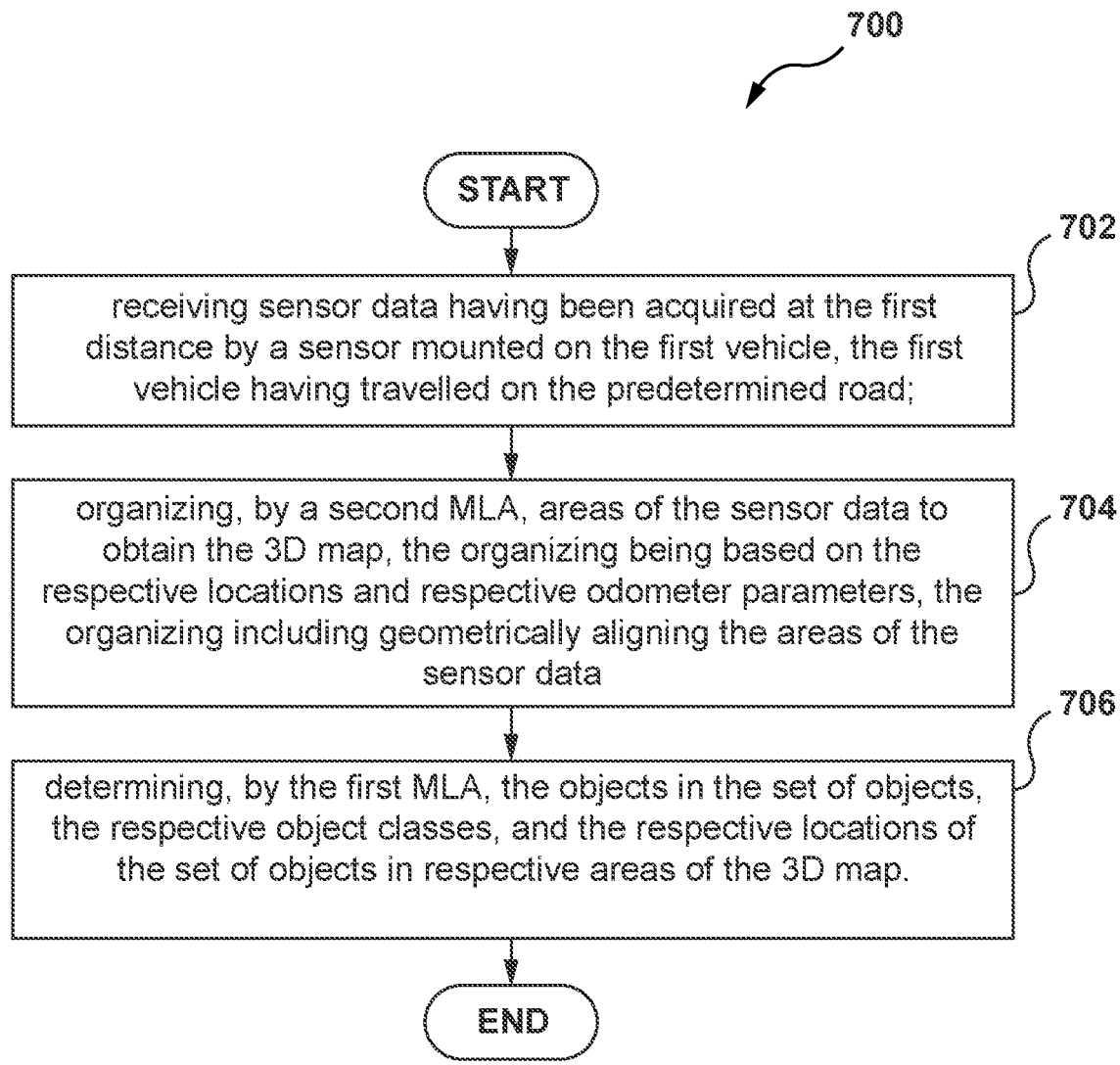
FIG. 7 depicts a flow chart of a method of generating a 3D map of the predetermined road in accordance with non-limiting embodiments of the present technology.

FIG. 7 depicts a flowchart of a method 700 of generating a 3D map 460 of the predetermined road 320 in accordance to non-limiting embodiments of the present technology.

The method 700 is executed by the server 270 after the data acquisition procedure 310. The processor 110 of the server 270 has access to computer-readable instructions (for example, stored in the solid-state drive 120 or the memory 130), which when executed cause the processor 110 to execute the method 700.

The method 700 begins at step 702.

Step 702: Receiving Sensor Data Having been Acquired at the First Distance by a Sensor Mounted on the First Vehicle, the First Vehicle Having Travelled on the Predetermined Road At step 702, the server 270 receives the LIDAR data 330 acquired by the second sensor 216 mounted on the first vehicle 210 travelling on the predetermined road 320. Each point 335 is associated with a first set of parameters 337. As a non-limiting example, the first set of parameters 337 may include: sensor parameters (i.e. data measured by the second sensor 216 or relating to the second sensor 216), vehicle parameters (i.e. data relative to the first vehicle 210), and other parameters.

In some embodiments of the present technology, the server 270 may receive the set of images 340 acquired by the first sensor 214 mounted on the first vehicle 210 travelling on the predetermined road 320. Each image 432 includes a respective set of pixels 345 forming the image 342. Each pixel (not numbered) of the respective set of pixels 345 of an image 342 of the set of images 340 is associated with a set of image parameters 347. The set of image parameters 347 includes optical parameters (i.e. data measured by the first sensor 214 or relating to the first sensor 214), vehicle parameters (i.e. relative to the vehicle on which the sensors are mounted on), and other parameters. In other embodiments of the present technology, each image 342 may also be associated with a set of image parameters (not depicted).

In some embodiments of the present technology, the server 270 may receive the RADAR data 350 of the predetermined road 320 acquired by the third sensor 218. Each point 352 is associated with a second set of parameters 357. As a non-limiting example, the second set of parameters 357 may include: sensor parameters (i.e. data measured by the third sensor 218 or relating to the third sensor 218), vehicle parameters (i.e. relating to the first vehicle 210), and other parameters.

The method 700 advances to step 704.

STEP 704: organizing, by a second MLA, areas of the sensor data to obtain the 3D map, the organizing being based on the respective locations and respective odometer parameters, the organizing including geometrically aligning the areas of the sensor data At step 704, the server 270 processes the set of images 340, the LIDAR data 330, and the RADAR data 350 of the predetermined road 320 to obtain a processed set of images 370, processed LIDAR data 380, and processed RADAR data 390, such that each of the processed set of images 370, the processed LIDAR data 380, and the processed RADAR data 390 are aligned temporally and spatially.

In some embodiments of the present technology, a second MLA (not depicted) of the plurality of MLAs 280 may perform the organization of the set of images 340, the LIDAR data 330, and the RADAR data 350 of the predetermined road 320.

The server 270 is configured to execute the data processing procedure 360 based on the set of image parameters 347 of the set of images 340, the first set of parameters 337 of the LIDAR data 330, and the second set of parameters 357 of the RADAR data 350.

In some embodiments of the present technology, the server 270 is configured to align the set of images 340, the LIDAR data 330, and the RADAR data 350 based on their respective timestamps in the set of image parameters 347, the first set of parameters 337, and the second set of parameters 357. The server 270 is configured to align the set of images 340, the LIDAR data 330, and the RADAR data 350 by transferring sensed information into a single coordinate system. As a non-limiting example, the alignment into a single coordinate system of the set of images 340, the LIDAR data 330, and the RADAR data 350 may be performed based on GPS parameters, timestamps, vehicle parameters and other parameters in the set of image parameters 347, the first set of parameters 337, and the second set of parameters 357.

The method 700 advances to step 706.

STEP 706: determining, by the first MLA, the objects in the set of objects, the respective object classes, and the respective locations of the set of objects in respective areas of the 3D map.

At step 706, the server 270 executes the first MLA 282 to output the processed LIDAR data 380, which may as an example include information about a set of objects identified on the predetermined road 320. The information may include as an example approximate location, size, class, of a given object in the set of objects.

The method 700 then ends.

Figure 8:
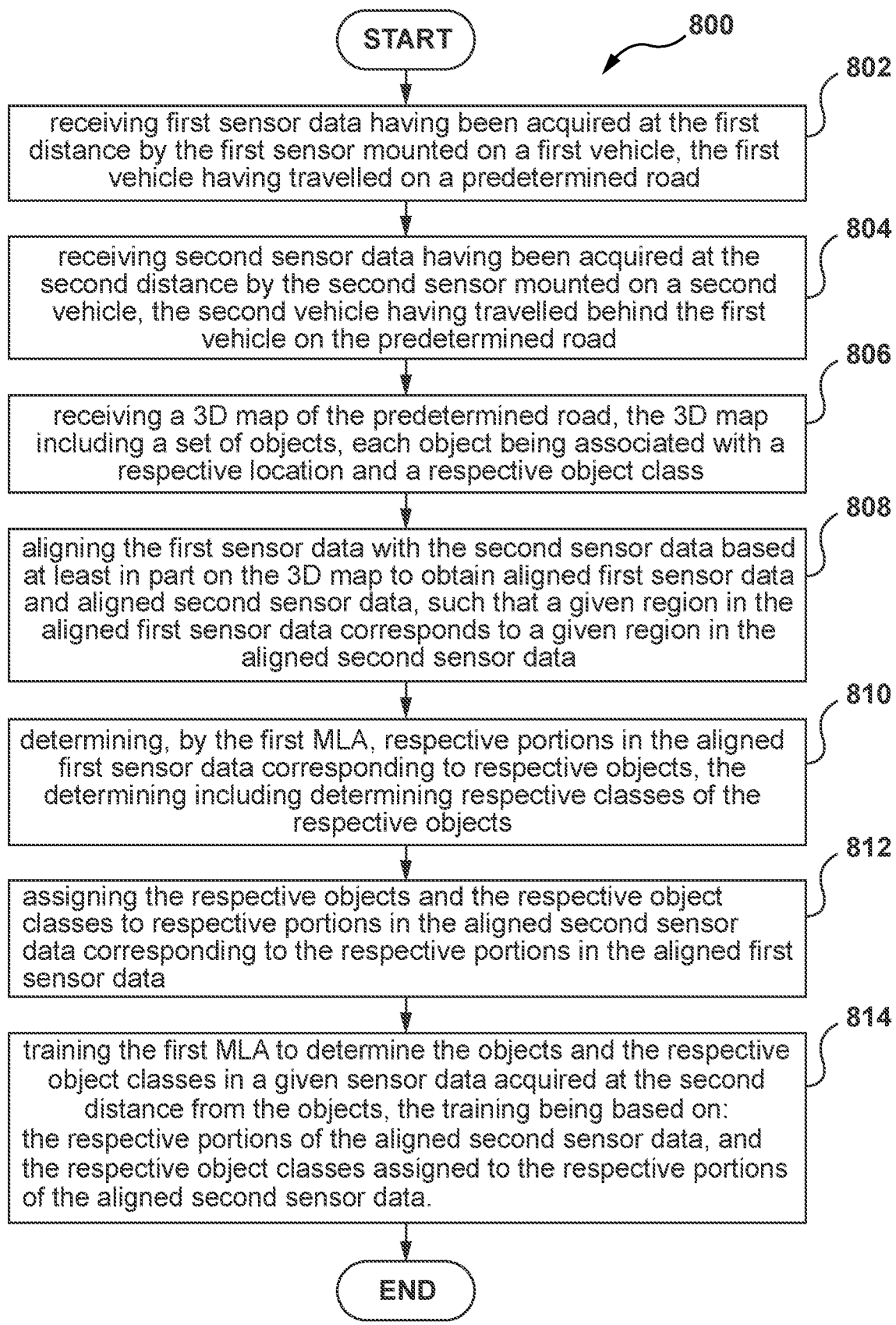
FIG. 8 depicts a flow chart of a method of training a machine learning algorithm to detect a given object at a second distance on the predetermined road in accordance with the non-limiting embodiments of the present technology.

FIG. 8 depicts a flowchart of a method 800 of training the first MLA 282 to detect a given object 540 at a second distance 530 on the predetermined road 320 according to non-limiting embodiments of the present technology.

The method 800 is executed by the server 270 after the method 700, and the two-vehicle data acquisition procedure 500. The processor 110 of the server 270 has access to computer-readable instructions (for example, stored in the solid-state drive 120 or the memory 130), which when executed cause the processor 110 to execute the method 800.

STEP 802: receiving first sensor data having been acquired at the first distance by the first sensor mounted on a first vehicle, the first vehicle having travelled on a predetermined road At step 802, the server 270 is configured to receive first vehicle sensor data 610 about the predetermined road 320 from the first electronic device 205. The first vehicle sensor data 610 has been acquired by the first electronic device 205 via at least a portion of the first plurality of sensors 212 of the first vehicle 210 travelling on the predetermined road 320 at a first distance 520 from a given object 540.

The first vehicle sensor data 610 generally includes at least a first vehicle LIDAR data 612 acquired by the second sensor 246.

Each point (not numbered) in the first vehicle LIDAR data 612 is associated with respective first vehicle LIDAR parameters 622, which are of the same nature as the first set of parameters 337, i.e. the respective first vehicle LIDAR parameters 622 may include sensor parameters (i.e. data measured by the second sensor 216 or relating to the second sensor 216), vehicle parameters (i.e. data relative to the first vehicle 210), and other parameters.

In some embodiments of the present technology, first vehicle sensor data 610 further includes a first set of images 614 acquired by the first sensor 214 and/or first vehicle RADAR data 616 acquired by the third sensor 218. Each pixel and/or image of the first set of images 614 may be associated with respective first image parameters 624, and each point of the first vehicle RADAR data 616 may be associated with respective first vehicle RADAR parameters 626.

The method 800 advances to step 804.

STEP 804: receiving second sensor data having been acquired at the second distance by the second sensor mounted on a second vehicle, the second vehicle having travelled behind the first vehicle on the predetermined road At step 804, the server 270 is configured to receive from the second electronic device 235, second vehicle sensor data 630 about the predetermined road 320 acquired by the second electronic device 235 via at least a portion of the second plurality of sensors 242. The second vehicle 240 has travelled within a distance behind the first vehicle 210, where the given object 540 sensed by the at least of the second plurality of sensors 242 on the predetermined road 320 is located at a second distance 530 from the at least of the second plurality of sensors 242.

The second vehicle sensor data 630 generally includes at least a second vehicle LIDAR data 632 acquired by the second sensor 246. Each point (not numbered) in the second vehicle LIDAR data 632 is associated with respective second vehicle LIDAR parameters 642, which are of the same nature as the first set of parameters 337, i.e. the respective second vehicle LIDAR parameters 642 may include: sensor parameters (i.e. data measured by the second sensor 246 or relating to the second sensor 246), vehicle parameters (i.e. data relative to the second vehicle 240), and other parameters.

In some embodiments of the present technology, the second vehicle sensor data 630 further includes a second set of images 634 acquired by the first sensor 244 and/or a second vehicle RADAR data 636 acquired by the third sensor 248. Each pixel and/or image of the second set of images 634 may be associated with respective second image parameters 644, and each point of the second vehicle RADAR data 636 may be associated with second vehicle RADAR parameters 646.

The method 800 advances to step 806.

STEP 806: receiving a 3D map of the predetermined road, the 3D map including a set of objects, each object being associated with a respective location and a respective object class At step 806, the server 270 is configured to receive the 3D map 460 having been generated by executing method 700 from a volatile or non-volatile memory, such as memory 130.

The method 800 advances to step 808.

STEP 808: aligning the first sensor data with the second sensor data based at least in part on the 3D map to obtain aligned first sensor data and aligned second sensor data, such that a given region in the aligned first sensor data corresponds to a given region in the aligned second sensor data At step 808, the server 270 is configured to execute the two-vehicle alignment procedure 640 based at least in part on the 3D map 460, and the first vehicle LIDAR data 612 of the first vehicle sensor data 610 and the second vehicle LIDAR data 632 of the second vehicle sensor data 630.

The server 270 may align the first vehicle sensor data 610 and the second vehicle sensor data 630 to obtain an aligned first vehicle sensor data 650 and an aligned second vehicle sensor data 655 respectively, such that the first vehicle sensor data 610 and the second vehicle sensor data 630 are represented in a single coordinate system, where a given region from the aligned first vehicle sensor data 650 corresponds to a given region in the aligned second vehicle sensor data 655. The server 270 is also configured to synchronise temporally the first vehicle sensor data 610 and the second vehicle sensor data 630.

In some embodiments of the present technology, the aligning may include segmentation, filtering, correction, matching, and clustering of the first vehicle sensor data 610 and the second vehicle sensor data 630.

The method 800 advances to step 810.

STEP 810: determining, by the first MLA, respective portions in the aligned first sensor data corresponding to respective objects, the determining including determining respective classes of the respective objects At step 810, the server 270 accesses the first MLA 282 for performing an object detection procedure 660 in the aligned first vehicle sensor data 650 based on the first aligned parameters 652. The first MLA 282 outputs the set of detected objects 670, the set of detected objects 670 having been detected in the aligned first vehicle sensor data 650. Each detected object 672 corresponds to a portion of the aligned first vehicle sensor data 650 (i.e. a number of points in the LIDAR point cloud) and is associated with a respective class label 674.

The method 800 advances to step 812.

STEP 812: assigning the respective objects and the respective object classes to respective portions in the aligned second sensor data corresponding to the respective portions in the aligned first sensor data At step 812, the server 270 is configured to label a given portion 682 in the aligned second vehicle sensor data 655 with a respective class label 684, where the given portion 682 corresponds to the detected object 672, and the respective class label 684 to the respective class label 674 in the set of detected objects 670.

The server 270 generates a set of training objects 680 for the aligned second vehicle sensor data 655.

The method 800 advances to step 814.

STEP 814: training the first MLA to determine the objects and the respective object classes in a given sensor data acquired at the second distance from the objects, the training being based on:

the respective portions of the aligned second sensor data, and the respective object classes assigned to the respective portions of the aligned second sensor data.

At step 814, the server 270 is configured to train the first MLA 282 on the set of training objects 680, such that the first MLA 282 may be able to detect objects in a point cloud acquired at the second distance 530 by a LIDAR instrument, such as the second sensor 246.

The method 800 then ends.

In sum, the present technology allows a MLA that has been previously trained to detect objects and features in sensor data having been acquired in standard conditions (i.e. conditions of initial training data) to detect the same objects and features in sensor data having been acquired in substandard conditions and having, to some extent, different representations of the objects and features. It is contemplated that the present technology may be employed on data acquired by one or more sensors, such as, but not limited to, cameras, LIDAR sensors and RADAR sensors for example.

It should be apparent to those skilled in the art that at least some embodiments of the present technology aim to expand a range of technical solutions for addressing a particular technical problem, namely improving performance of a machine learning algorithm to classify objects in sensor data by re-training the machine learning algorithm to classify objects in sensor data having been acquired in conditions inferior to the initial training conditions. Such an approach may allow saving resources used by an electronic device.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for training a first machine-learning algorithm (MLA) to detect objects in sensor data acquired by a second sensor located at a second distance from the objects, the first MLA having been trained to recognize the objects in sensor data acquired by a first sensor located at a first distance from the objects, the second distance being greater than the first distance, the method being executed at a server, the method comprising:

receiving, by the server, first sensor data having been acquired at the first distance by the first sensor mounted on a first vehicle, the first vehicle having travelled on a predetermined road;

receiving, by the server, second sensor data having been acquired at the second distance by the second sensor mounted on a second vehicle, the second vehicle having travelled behind the first vehicle on the predetermined road;

receiving, by the server, a 3D map of the predetermined road, the 3D map including a set of objects;

aligning, by the server, the first sensor data with the second sensor data based at least in part on the set of objects in the 3D map to obtain aligned first sensor data and aligned second sensor data, such that a given region in the aligned first sensor data corresponds to a given region in the aligned second sensor data;

determining, by the first MLA, respective portions in the aligned first sensor data corresponding to respective objects, the determining including determining respective classes of the respective objects;

assigning, by the server, the respective objects and the respective object classes to respective portions in the aligned second sensor data corresponding to the respective portions in the aligned first sensor data; and training, by the server, the first MLA to determine the objects and the respective object classes in given sensor data acquired at the second distance from the objects, the training being based on:
the respective portions of the aligned second sensor data, and
the respective object classes assigned to the respective portions of the aligned second sensor data, wherein the respective object classes were determined based on the first sensor data.

2. The method of claim 1, wherein
each object of the set of objects is associated with a respective location;
wherein each point of the first sensor data is associated with a respective timestamp and a respective location;
wherein each point of the second sensor data is associated with a respective timestamp and a respective location; and
wherein the aligning is based on:
respective timestamps of the first and second sensor data,
respective locations of the first and second sensor data, and
respective locations of the set of objects in the 3D map of the predetermined road.

3. The method of claim 2, wherein
each object of the set of objects is associated with a respective object class; and
wherein the respective objects and the respective object classes corresponding to the respective portions in the aligned first sensor data determined by the first MLA include the set of objects and the respective object classes in the 3D map of the predetermined road.

4. The method of claim 3, wherein the 3D map of the predetermined road has been previously generated by:
receiving, by the server, the first sensor data, each sensor data point of the first sensor data being associated with respective location and odometer parameters;
organizing, areas of the first sensor data to obtain the 3D map, the organizing being based on the respective location and odometer parameters, the organizing including geometrically aligning the areas of the first sensor data; and
determining, by the first MLA, the objects in the set of objects, and, for each object, an object class and a location of the object.

5. The method of claim 4, wherein
the location of the object includes: a latitude, and a longitude; and wherein
the respective odometer parameters include: gear, wheel rotation speed, inertial measurement unit (IMU) parameters, throttle, steering angle, and speed.

6. The method of claim 1, wherein the aligning is executed by another MLA on the server, the other MLA implementing a clustering algorithm.

7. The method of claim 1, wherein:
the first sensor is a first LIDAR sensor; and
the second sensor is a second LIDAR sensor.

8. The method of claim 7, wherein
the server executes a third MLA, the third MLA having been trained to recognize objects in images acquired by a camera sensor;
wherein the method further comprises, prior to the aligning:
receiving, by the server, a set of images having been acquired by a camera sensor mounted on the second vehicle, each image being associated with a respective location; and
associating, by the third MLA, each image of the set of images with at least one respective object of the set of objects based at least in part on the respective location of the image and the respective location of the at least one respective object; and
wherein training the first MLA is further based on the set of images.

9. The method of claim 8, wherein
the server executes a fourth MLA, the fourth MLA having been trained to recognize objects in data acquired by a radar sensor;
wherein the method further comprises, prior to the aligning:
receiving, by the server, radar sensor data having been acquired at the second distance by the radar sensor mounted on the second vehicle, each point of the radar sensor data being associated with a respective timestamp and a respective location;
wherein the aligning further comprises aligning the radar sensor data to obtain aligned radar sensor data, the aligning being further based on the respective locations of the radar sensor data;
wherein the method further comprises, after the aligning:
determining, by the fourth MLA, respective portions of the aligned radar sensor data corresponding to the respective objects, the determining including determining the respective object classes of the respective objects;
and wherein training the first MLA is further based on the radar sensor data.

10. The method of claim 1, wherein the first MLA is a convolutional neural network (CNN).

11. The method of claim 1, wherein the first MLA is a gradient boosting classification algorithm.

12. The method of claim 1, wherein the method further comprises, during a training phase of the first MLA:
receiving, by the server, the first sensor data, the first sensor data including a set of labelled objects;
processing, by the server, the second sensor data to extract a set of features, the features including a first set of parameters;
training, by the server, the MLA to determine a label for a given object based on the set of features, the training being based on the set of labelled objects in the first sensor data.

13. The method of claim 1, further comprising generating a plurality of training objects, wherein each training object of the plurality of training objects comprises:
a portion of the aligned second sensor data, and
a label indicating an object class, wherein the label was determined based on the first sensor data, and
wherein training the first MLA comprises using the plurality of training objects to train the first MLA.

14. A computer-implemented method for training a machine-learning algorithm (MLA) to detect objects in sensor data acquired by a second sensor in a second physical setting, the MLA having been trained to recognize the objects in sensor data acquired by a first sensor in a first physical setting, the objects in the sensor data acquired in the first physical setting having a different representation than the objects in the sensor data acquired in the second physical setting, the method being executed at a server, the method comprising:
- receiving, by the server, first sensor data having been acquired in the first physical setting by the first sensor mounted on a first vehicle, the first vehicle having travelled on a predetermined road;
- receiving, by the server, second sensor data having been acquired in the second physical setting by the second sensor mounted on a second vehicle, the second vehicle having travelled on the predetermined road;
- aligning, by the server, the first sensor data with the second sensor data to obtain aligned first sensor data and aligned second sensor data in a single coordinate system such that a given region in the aligned first sensor data corresponds to a given region in the aligned second sensor data;
- determining, by the MLA, respective portions in the aligned first sensor data corresponding to respective objects, the determining including determining respective classes of the respective objects;
- assigning, by the server, the respective objects and the respective object classes to respective portions in the aligned second sensor data corresponding to the respective portions in the aligned first sensor data; and
- training, by the server, the MLA to determine the objects and the respective object classes in given sensor data acquired in the second physical setting, the training being based on:
  - the respective portions of the aligned second sensor data, and
  - the respective object classes assigned to the respective portions of the aligned second sensor data, wherein the respective object classes were determined based on the first sensor data.

15. A server for training a first machine-learning algorithm (MLA) to detect objects in sensor data acquired by a second sensor located at a second distance from the objects, the first MLA having been trained to recognize the objects in sensor data acquired by a first sensor located at a first distance from the objects, the second distance being greater than the first distance, the server comprising:
- a processor;
- a non-transitory computer-readable medium comprising instructions;
- the processor, upon executing the instructions, being configured to:
  - receive first sensor data having been acquired at the first distance by the first sensor mounted on a first vehicle, the first vehicle having travelled on a predetermined road;
  - receive second sensor data having been acquired at the second distance by the second sensor mounted on a second vehicle, the second vehicle having travelled behind the first vehicle on the predetermined road;
  - receive a 3D map of the predetermined road, the 3D map including a set of objects;
  - align the first sensor data with the second sensor data based at least in part on the set of objects in the 3D map to obtain aligned first sensor data and aligned second sensor data, such that a given region in the aligned first sensor data corresponds to a given region in the aligned second sensor data;
  - determine, via the first MLA, respective portions in the aligned first sensor data corresponding to respective objects, the determining including determining respective classes of the respective objects;
  - assign the respective objects and the respective object classes to respective portions in the aligned second sensor data corresponding to the respective portions in the aligned first sensor data; and
  - train the first MLA to determine the objects and the respective object classes in given sensor data acquired at the second distance from the objects, the training being based on:
    - the respective portions of the aligned second sensor data, and
    - the respective object classes assigned to the respective portions of the aligned second sensor data, wherein the respective object classes were determined based on the first sensor data.

16. The server of claim 15, wherein
each object of the set of objects is associated with a respective location;
wherein each point of the first sensor data is associated with a respective timestamp and a respective location;
wherein each point of the second sensor data is associated with a respective timestamp and a respective location; and
wherein the aligning is based on:
- respective timestamps of the first and second sensor data,
- respective locations of the first and second sensor data, and
- respective locations of the set of objects in the 3D map of the predetermined road.

17. The server of claim 16, wherein
each object of the set of objects is associated with a respective object class; and
wherein the respective objects and the respective object classes corresponding to the respective portions in the aligned first sensor data determined by the first MLA include the set of objects and the respective object classes in the 3D map of the predetermined road.

18. The server of claim 17, wherein the 3D map of the predetermined road has been previously generated by the processor by executing computer-readable instructions causing the processor to:
- receive the first sensor data, each sensor data point of the first sensor data being associated with respective location and odometer parameters;
- organize areas of the first sensor data to obtain the 3D map, the organizing being based on the respective location and odometer parameters, the organizing including geometrically aligning the areas of the first sensor data; and
- determine, via the first MLA, the objects in the set of objects, and, for each object, an object class and a location of the object.

19. The server of claim 18, wherein
the location of the object includes: a latitude, and a longitude; and wherein
the respective odometer parameters include: gear, wheel rotation speed, inertial measurement unit (IMU) parameters, throttle, steering angle, and speed.

20. The server of claim 15, wherein:
the first sensor is a first LIDAR sensor; and
the second sensor is a second LIDAR sensor; and wherein
the server executes a third MLA, the third MLA having been trained to recognize objects in images acquired by a camera sensor; and wherein
the processor is further configured to, prior to the aligning:
  receive a set of images having been acquired by a camera sensor mounted on the second vehicle, each image being associated with a respective location; and
  associate, via the third MLA, each image of the set of images with at least one respective object of the set of objects based at least in part on the respective location of the image and the respective location of the at least one respective object; and
wherein training the first MLA is further based on the set of images.

\* \* \* \* \*